United States Patent
Fullerton et al.

(10) Patent No.: US 9,404,776 B2
(45) Date of Patent: *Aug. 2, 2016

(54) SYSTEM AND METHOD FOR TAILORING POLARITY TRANSITIONS OF MAGNETIC STRUCTURES

(71) Applicant: Correlated Magnetics Research, LLC, Huntsville, AL (US)

(72) Inventors: Larry W. Fullerton, New Hope, AL (US); Jacob S. Zimmerman, Saint Paul, MN (US); Robert S. Evans, Austin, TX (US); David P. Machado, Machado, AL (US); Jason N. Morgan, Brownsboro, AL (US); Mark D. Roberts, Huntsville, AL (US)

(73) Assignee: Correlated Magnetics Research, LLC., Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/462,341

(22) Filed: Aug. 18, 2014

(65) Prior Publication Data

US 2015/0042430 A1    Feb. 12, 2015

Related U.S. Application Data

(63) Continuation-in-part of application No. 14/045,756, filed on Oct. 3, 2013, now Pat. No. 8,810,348, which is a continuation-in-part of application No. 13/240,335, filed on Sep. 22, 2011, now Pat. No. 8,648,681, which (Continued)

(51) Int. Cl.
*H01F 7/02* (2006.01)
*H01F 13/00* (2006.01)
(Continued)

(52) U.S. Cl.
CPC .............. *G01D 18/00* (2013.01); *H01F 7/021* (2013.01); *H01F 7/0242* (2013.01);
(Continued)

(58) Field of Classification Search
CPC .............................. H01F 7/021; H01F 13/003
USPC .................................................. 335/284, 302
See application file for complete search history.

(56) References Cited

U.S. PATENT DOCUMENTS

| 93,931 A | 8/1869 | Westcott |
|---|---|---|
| 361,248 A | 4/1887 | Winton |

(Continued)

FOREIGN PATENT DOCUMENTS

| CN | 1615573 | 5/2005 |
|---|---|---|
| DE | 2938782 | 4/1981 |

(Continued)

OTHER PUBLICATIONS

United States Office Action issued in U.S. Appl. No. 13/529,520 dated Sep. 28, 2012.

(Continued)

*Primary Examiner* — Ramon M Barrera
(74) *Attorney, Agent, or Firm* — Vector IP Law Group; Robert S. Babayi

(57) ABSTRACT

A system and method for tailoring a polarity transition of a magnetic structure is provided that involves printing one or more reinforcing maxels alongside one side or both sides of a polarity transition boundary between a first polarity region of the magnetic structure having a first polarity and a second polarity region of the magnetic structure having a second polarity, where printing reinforcing maxels alongside the polarity transition boundary improves the magnetic field characteristics of the polarity transition.

20 Claims, 22 Drawing Sheets

Related U.S. Application Data is a continuation-in-part of application No. 12/476,952, filed on Jun. 2, 2009, now Pat. No. 8,179,219, and a continuation-in-part of application No. 12/895,589, filed on Sep. 30, 2010, now Pat. No. 8,760,250, and a continuation-in-part of application No. 12/885,450, filed on Sep. 18, 2010, now Pat. No. 7,982,568, and a continuation-in-part of application No. 12/476,952, filed on Jun. 2, 2009, now Pat. No. 8,179,219, said application No. 14/045,756 is a continuation-in-part of application No. 13/246,584, filed on Sep. 27, 2011, now Pat. No. 8,760,251.

(60) Provisional application No. 62/022,092, filed on Jul. 8, 2014, provisional application No. 61/744,864, filed on Oct. 4, 2012, provisional application No. 61/403,814, filed on Sep. 22, 2010, provisional application No. 61/462,715, filed on Feb. 7, 2011, provisional application No. 61/277,214, filed on Sep. 22, 2009, provisional application No. 61/277,900, filed on Sep. 30, 2009, provisional application No. 61/279,094, filed on Oct. 16, 2009, provisional application No. 61/281,160, filed on Nov. 13, 2009, provisional application No. 61/283,780, filed on Dec. 9, 2009, provisional application No. 61/284,385, filed on Dec. 17, 2009, provisional application No. 61/342,988, filed on Apr. 22, 2010, provisional application No. 61/278,767, filed on Oct. 9, 2009.

(51) Int. Cl.
  *G01D 18/00* (2006.01)
  *H01T 13/32* (2006.01)
  *H02K 41/035* (2006.01)
  *H02K 1/02* (2006.01)
  *H02K 15/03* (2006.01)

(52) U.S. Cl.
  CPC .......... *H01F 7/0284* (2013.01); *H01F 13/003* (2013.01); *H01T 13/32* (2013.01); *H02K 1/02* (2013.01); *H02K 41/0358* (2013.01); *H02K 15/03* (2013.01)

(56) References Cited

U.S. PATENT DOCUMENTS

| | | |
|---|---|---|
| 381,968 A | 5/1888 | Tesla |
| 493,858 A | 3/1893 | Edison |
| 675,323 A | 5/1901 | Clark |
| 687,292 A | 11/1901 | Armstrong |
| 996,933 A | 7/1911 | Lindquist |
| 1,081,462 A | 12/1913 | Patton |
| 1,171,351 A | 2/1916 | Neuland |
| 1,236,234 A | 8/1917 | Troje |
| 1,252,289 A | 1/1918 | Murray, Jr. |
| 1,301,135 A | 4/1919 | Karasick |
| 1,312,546 A | 8/1919 | Karasick |
| 1,323,546 A | 8/1919 | Karasick |
| 1,554,236 A | 1/1920 | Simmons |
| 1,343,751 A | 6/1920 | Simmons |
| 1,624,741 A | 12/1926 | Leppke et al. |
| 1,784,256 A | 12/1930 | Stout |
| 1,895,129 A | 1/1933 | Jones |
| 2,048,161 A | 7/1936 | Klaiber |
| 2,147,482 A | 12/1936 | Butler |
| 2,186,074 A | 1/1940 | Koller |
| 2,240,035 A | 4/1941 | Catherall |
| 2,243,555 A | 5/1941 | Faus |
| 2,269,149 A | 1/1942 | Edgar |
| 2,327,748 A | 8/1943 | Smith |
| 2,337,248 A | 12/1943 | Koller |
| 2,337,249 A | 12/1943 | Koller |
| 2,389,298 A | 11/1945 | Ellis |
| 2,401,887 A | 6/1946 | Sheppard |
| 2,414,653 A | 1/1947 | Iokholder |
| 2,438,231 A | 3/1948 | Schultz |
| 2,471,634 A | 5/1949 | Vennice |
| 2,475,456 A | 7/1949 | Norlander |
| 2,508,305 A | 5/1950 | Teetor |
| 2,513,226 A | 6/1950 | Wylie |
| 2,514,927 A | 7/1950 | Bernhard |
| 2,520,828 A | 8/1950 | Bertschi |
| 2,565,624 A | 8/1951 | phelon |
| 2,570,625 A | 10/1951 | Zimmerman et al. |
| 2,690,349 A | 9/1954 | Teetor |
| 2,694,164 A | 11/1954 | Geppelt |
| 2,964,613 A | 11/1954 | Williams |
| 2,701,158 A | 2/1955 | Schmitt |
| 2,722,627 A | 11/1955 | Cluwen et al. |
| 2,770,759 A | 11/1956 | Ahlgren |
| 2,837,366 A | 6/1958 | Loeb |
| 2,853,331 A | 9/1958 | Teetor |
| 2,888,291 A | 5/1959 | Scott et al. |
| 2,896,991 A | 7/1959 | Martin, Jr. |
| 2,932,545 A | 4/1960 | Foley |
| 2,935,352 A | 5/1960 | Heppner |
| 2,935,353 A | 5/1960 | Loeb |
| 2,936,437 A | 5/1960 | Fraser et al. |
| 2,962,318 A | 11/1960 | Teetor |
| 3,055,999 A | 9/1962 | Lucas |
| 3,089,986 A | 5/1963 | Gauthier |
| 3,102,314 A | 9/1963 | Alderfer |
| 3,151,902 A | 10/1964 | Ahlgren |
| 3,204,995 A | 9/1965 | Teetor |
| 3,208,296 A | 9/1965 | Baermann |
| 3,238,399 A | 3/1966 | Johanees et al. |
| 3,273,104 A | 9/1966 | Krol |
| 3,288,511 A | 11/1966 | Tavano |
| 3,301,091 A | 1/1967 | Reese |
| 3,351,368 A | 11/1967 | Sweet |
| 3,382,386 A | 5/1968 | Schlaeppi |
| 3,408,104 A | 10/1968 | Raynes |
| 3,414,309 A | 12/1968 | Tresemer |
| 3,425,729 A | 2/1969 | Bisbing |
| 3,468,576 A | 9/1969 | Beyer et al. |
| 3,474,366 A | 10/1969 | Barney |
| 3,500,090 A | 3/1970 | Baermann |
| 3,521,216 A | 7/1970 | Tolegian |
| 3,645,650 A | 2/1972 | Laing |
| 3,668,670 A | 6/1972 | Andersen |
| 3,684,992 A | 8/1972 | Huguet et al. |
| 3,690,393 A | 9/1972 | Guy |
| 3,696,258 A | 10/1972 | Anderson et al. |
| 3,790,197 A | 2/1974 | Parker |
| 3,791,309 A | 2/1974 | Baermann |
| 3,802,034 A | 4/1974 | Bookless |
| 3,803,433 A | 4/1974 | Ingenito |
| 3,808,577 A | 4/1974 | Mathauder |
| 3,836,801 A | 9/1974 | Yamashita et al. |
| 3,845,430 A | 10/1974 | Petkewicz et al. |
| 3,893,059 A | 7/1975 | Nowak |
| 3,976,316 A | 8/1976 | Laby |
| 4,079,558 A | 3/1978 | Gorham |
| 4,117,431 A | 9/1978 | Eicher |
| 4,129,846 A | 12/1978 | Yablochnikov |
| 4,209,905 A | 7/1980 | Gillings |
| 4,222,489 A | 9/1980 | Hutter |
| 4,296,394 A | 10/1981 | Ragheb |
| 4,340,833 A | 7/1982 | Sudo et al. |
| 4,352,960 A | 10/1982 | Dormer et al. |
| 4,355,236 A | 10/1982 | Holsinger |
| 4,399,595 A | 8/1983 | Yoon et al. |
| 4,416,127 A | 11/1983 | Gomez-Olea Naveda |
| 4,451,811 A | 5/1984 | Hoffman |
| 4,453,294 A | 6/1984 | Morita |
| 4,517,483 A | 5/1985 | Hucker et al. |
| 4,535,278 A | 8/1985 | Asakawa |
| 4,547,756 A | 10/1985 | Miller et al. |
| 4,614,929 A * | 9/1986 | Tsukuda .............. H01F 13/003 335/284 |

(56) References Cited

U.S. PATENT DOCUMENTS

| | | | |
|---|---|---|---|
| 4,629,131 | A | 12/1986 | Podell |
| 4,645,283 | A | 2/1987 | Macdonald et al. |
| 4,680,494 | A | 7/1987 | Grosjean |
| 4,764,743 | A | 8/1988 | Leupold et al. |
| 4,808,955 | A | 2/1989 | Godkin et al. |
| 4,837,539 | A | 6/1989 | Baker |
| 4,849,749 | A | 7/1989 | Fukamachi et al. |
| 4,862,128 | A | 8/1989 | Leupold |
| 4,893,103 | A | 1/1990 | Leupold |
| 4,912,727 | A | 3/1990 | Schubert |
| 4,941,236 | A | 7/1990 | Sherman et al. |
| 4,956,625 | A | 9/1990 | Cardone et al. |
| 4,980,593 | A | 12/1990 | Edmundson |
| 4,993,950 | A | 2/1991 | Mensor, Jr. |
| 4,994,778 | A | 2/1991 | Leupold |
| 4,996,457 | A | 2/1991 | Hawsey et al. |
| 5,013,949 | A | 5/1991 | Mabe, Jr. |
| 5,020,625 | A | 6/1991 | Yamauchi et al. |
| 5,050,276 | A | 9/1991 | Pemberton |
| 5,062,855 | A | 11/1991 | Rincoe |
| 5,123,843 | A | 6/1992 | Van der Zel et al. |
| 5,179,307 | A | 1/1993 | Porter |
| 5,190,325 | A | 3/1993 | Doss-Desouza |
| 5,200,729 | A * | 4/1993 | Soeda .................. H01F 7/021 335/284 |
| 5,213,307 | A | 5/1993 | Perrillat-Amede |
| 5,302,929 | A | 4/1994 | Kovacs |
| 5,309,680 | A | 5/1994 | Kiel |
| 5,345,207 | A | 9/1994 | Gebele |
| 5,349,258 | A | 9/1994 | Leupold et al. |
| 5,367,891 | A | 11/1994 | Furuyama |
| 5,383,049 | A | 1/1995 | Carr |
| 5,394,132 | A | 2/1995 | Poil |
| 5,399,933 | A | 3/1995 | Tsai |
| 5,425,763 | A | 6/1995 | Stemmann |
| 5,440,997 | A | 8/1995 | Crowley |
| 5,461,386 | A | 10/1995 | Knebelkamp |
| 5,485,435 | A | 1/1996 | Matsuda et al. |
| 5,492,572 | A | 2/1996 | Schroeder et al. |
| 5,495,221 | A | 2/1996 | Post |
| 5,512,732 | A | 4/1996 | Yagnik et al. |
| 5,557,248 | A * | 9/1996 | Prochazka ............ H01F 13/003 335/284 |
| 5,570,084 | A | 10/1996 | Ritter et al. |
| 5,582,522 | A | 12/1996 | Johnson |
| 5,604,960 | A | 2/1997 | Good |
| 5,631,093 | A | 5/1997 | Perry et al. |
| 5,631,618 | A | 5/1997 | Trumper et al. |
| 5,633,555 | A | 5/1997 | Ackermann et al. |
| 5,635,889 | A | 6/1997 | Stelter |
| 5,637,972 | A | 6/1997 | Randall et al. |
| 5,730,155 | A | 3/1998 | Allen |
| 5,742,036 | A | 4/1998 | Schramm, Jr. et al. |
| 5,759,054 | A | 6/1998 | Apadafore |
| 5,788,493 | A | 8/1998 | Tanaka et al. |
| 5,838,304 | A | 11/1998 | Hall |
| 5,852,393 | A | 12/1998 | Reznik et al. |
| 5,935,155 | A | 8/1999 | Humayun et al. |
| 5,956,778 | A | 9/1999 | Godoy |
| 5,983,406 | A | 11/1999 | Meyerrose |
| 6,000,484 | A | 12/1999 | Zoretich et al. |
| 6,039,759 | A | 3/2000 | Carpentier et al. |
| 6,047,456 | A | 4/2000 | Yao et al. |
| 6,072,251 | A | 6/2000 | Markle |
| 6,074,420 | A | 6/2000 | Eaton |
| 6,104,108 | A | 8/2000 | Hazelton et al. |
| 6,115,849 | A | 9/2000 | Meyerrose |
| 6,118,271 | A | 9/2000 | Ely et al. |
| 6,120,283 | A | 9/2000 | Cousins |
| 6,125,955 | A | 10/2000 | Zoretich et al. |
| 6,142,779 | A | 11/2000 | Siegel et al. |
| 6,170,131 | B1 | 1/2001 | Shin |
| 6,187,041 | B1 | 2/2001 | Garonzik |
| 6,188,147 | B1 | 2/2001 | Hazelton et al. |
| 6,205,012 | B1 | 3/2001 | Lear |
| 6,208,489 | B1 | 3/2001 | Marchon |
| 6,210,033 | B1 | 4/2001 | Karkos, Jr. et al. |
| 6,224,374 | B1 | 5/2001 | Mayo |
| 6,234,374 | B1 | 5/2001 | Hwang et al. |
| 6,241,069 | B1 | 6/2001 | Mazur et al. |
| 6,273,918 | B1 | 8/2001 | Yuhasz et al. |
| 6,275,778 | B1 | 8/2001 | Shimada et al. |
| 6,285,097 | B1 | 9/2001 | Hazelton et al. |
| 6,387,096 | B1 | 5/2002 | Hyde, Jr. |
| 6,422,533 | B1 | 7/2002 | Harms |
| 6,457,179 | B1 | 10/2002 | Prendergast |
| 6,467,326 | B1 | 10/2002 | Garrigus |
| 6,535,092 | B1 | 3/2003 | Hurley et al. |
| 6,540,515 | B1 | 4/2003 | Tanaka |
| 6,561,815 | B1 | 5/2003 | Schmidt |
| 6,599,321 | B2 | 7/2003 | Hyde, Jr. |
| 6,607,304 | B1 | 8/2003 | Lake et al. |
| 6,652,278 | B2 | 11/2003 | Honkura et al. |
| 6,653,919 | B2 | 11/2003 | Shih-Chung et al. |
| 6,720,698 | B2 | 4/2004 | Galbraith |
| 6,747,537 | B1 | 6/2004 | Mosteller |
| 6,821,126 | B2 | 11/2004 | Neidlein |
| 6,841,910 | B2 | 1/2005 | Gery |
| 6,842,332 | B1 | 1/2005 | Rubenson et al. |
| 6,847,134 | B2 | 1/2005 | Frissen et al. |
| 6,850,139 | B1 | 2/2005 | dettmann et al. |
| 6,862,748 | B2 | 3/2005 | Prendergast |
| 6,864,773 | B2 | 3/2005 | Perrin |
| 6,913,471 | B2 | 7/2005 | Smith |
| 6,927,657 | B1 | 8/2005 | Wu |
| 6,936,937 | B2 | 8/2005 | Tu et al. |
| 6,954,968 | B1 | 10/2005 | Sitbon |
| 6,971,147 | B2 | 12/2005 | Halstead |
| 7,009,874 | B2 | 3/2006 | Deak |
| 7,016,492 | B2 | 3/2006 | Pan et al. |
| 7,031,160 | B2 | 4/2006 | Tillotson |
| 7,033,400 | B2 | 4/2006 | Currier |
| 7,038,565 | B1 | 5/2006 | Chell |
| 7,065,860 | B2 | 6/2006 | Aoki et al. |
| 7,066,739 | B2 | 6/2006 | Mcleish |
| 7,066,778 | B2 | 6/2006 | Kretzschmar |
| 7,097,461 | B2 | 8/2006 | Neidlein |
| 7,101,374 | B2 | 9/2006 | Hyde, Jr. |
| 7,135,792 | B2 | 11/2006 | Devaney et al. |
| 7,137,727 | B2 | 11/2006 | Joseph et al. |
| 7,186,265 | B2 | 3/2007 | Sharkawy et al. |
| 7,224,252 | B2 | 5/2007 | Meadow, Jr. et al. |
| 7,264,479 | B1 | 9/2007 | Lee |
| 7,276,025 | B2 | 10/2007 | Roberts et al. |
| 7,311,526 | B2 | 12/2007 | Rohrbach et al. |
| 7,324,320 | B2 | 1/2008 | Maurer et al. |
| 7,339,790 | B2 | 3/2008 | Baker et al. |
| 7,344,380 | B2 | 3/2008 | Neidlein et al. |
| 7,351,066 | B2 | 4/2008 | DiFonzo et al. |
| 7,358,724 | B2 | 4/2008 | Taylor et al. |
| 7,362,018 | B1 | 4/2008 | Kulogo et al. |
| 7,364,433 | B2 | 4/2008 | Neidlein |
| 7,381,181 | B2 | 6/2008 | Lau et al. |
| 7,402,175 | B2 | 7/2008 | Azar |
| 7,416,414 | B2 | 8/2008 | Bozzone et al. |
| 7,438,726 | B2 | 10/2008 | Erb |
| 7,444,683 | B2 | 11/2008 | Prendergast et al. |
| 7,453,341 | B1 | 11/2008 | Hildenbrand |
| 7,467,948 | B2 | 12/2008 | Lindberg et al. |
| 7,498,914 | B2 | 3/2009 | Miyashita et al. |
| 7,583,500 | B2 | 9/2009 | Ligtenberg et al. |
| 7,637,746 | B2 | 12/2009 | Lindberg et al. |
| 7,645,143 | B2 | 1/2010 | Rohrbach et al. |
| 7,658,613 | B1 | 2/2010 | Griffin et al. |
| 7,715,890 | B2 | 5/2010 | Kim et al. |
| 7,750,524 | B2 | 7/2010 | Sugimoto et al. |
| 7,762,817 | B2 | 7/2010 | Ligtenberg et al. |
| 7,775,567 | B2 | 8/2010 | Ligtenberg et al. |
| 7,796,002 | B2 | 9/2010 | Hashimoto et al. |
| 7,799,281 | B2 | 9/2010 | Cook et al. |
| 7,808,349 | B2 | 10/2010 | Fullerton et al. |
| 7,812,697 | B2 | 10/2010 | Fullerton et al. |
| 7,817,004 | B2 | 10/2010 | Fullerton et al. |
| 7,828,556 | B2 | 11/2010 | Rodrigues |

(56) References Cited

U.S. PATENT DOCUMENTS

| | | |
|---|---|---|
| 7,832,897 B2 | 11/2010 | Ku |
| 7,837,032 B2 | 11/2010 | Smeltzer |
| 7,839,246 B2 | 11/2010 | Fullerton et al. |
| 7,843,297 B2 | 11/2010 | Fullerton et al. |
| 7,868,721 B2 | 1/2011 | Fullerton et al. |
| 7,871,272 B2 | 1/2011 | Firman, II et al. |
| 7,874,856 B1 | 1/2011 | Schriefer et al. |
| 7,889,037 B2 | 2/2011 | Cho |
| 7,901,216 B2 | 3/2011 | Rohrbach et al. |
| 7,903,397 B2 | 3/2011 | McCoy |
| 7,905,626 B2 | 3/2011 | Shantha et al. |
| 7,997,906 B2 | 8/2011 | Ligtenberg et al. |
| 8,002,585 B2 | 8/2011 | Zhou |
| 8,009,001 B1 | 8/2011 | Cleveland |
| 8,050,714 B2 | 11/2011 | Fadell et al. |
| 8,078,224 B2 | 12/2011 | Fadell et al. |
| 8,078,776 B2 | 12/2011 | Novotney et al. |
| 8,087,939 B2 | 1/2012 | Rohrbach et al. |
| 8,099,964 B2 | 1/2012 | Saito et al. |
| 8,138,869 B1 | 3/2012 | Lauder et al. |
| 8,143,982 B1 | 3/2012 | Lauder et al. |
| 8,143,983 B1 | 3/2012 | Lauder et al. |
| 8,165,634 B2 | 4/2012 | Fadell et al. |
| 8,177,560 B2 | 5/2012 | Rohrbach et al. |
| 8,187,006 B2 | 5/2012 | Rudisill et al. |
| 8,190,205 B2 | 5/2012 | Fadell et al. |
| 8,242,868 B2 | 8/2012 | Lauder et al. |
| 8,253,518 B2 | 8/2012 | Lauder et al. |
| 8,264,310 B2 | 9/2012 | Lauder et al. |
| 8,264,314 B2 | 9/2012 | Sankar |
| 8,271,038 B2 | 9/2012 | Fadell et al. |
| 8,271,705 B2 | 9/2012 | Novotney et al. |
| 8,297,367 B2 | 10/2012 | Chen et al. |
| 8,344,836 B2 | 1/2013 | Lauder et al. |
| 8,348,678 B2 | 1/2013 | Hardisty et al. |
| 8,354,767 B2 | 1/2013 | Pennander et al. |
| 8,390,411 B2 | 3/2013 | Lauder et al. |
| 8,390,412 B2 | 3/2013 | Lauder et al. |
| 8,390,413 B2 | 3/2013 | Lauder et al. |
| 8,395,465 B2 | 3/2013 | Lauder et al. |
| 8,398,409 B2 | 3/2013 | Schmidt |
| 8,435,042 B2 | 5/2013 | Rohrbach et al. |
| 8,454,372 B2 | 6/2013 | Lee |
| 8,467,829 B2 | 6/2013 | Fadell et al. |
| 8,497,753 B2 | 7/2013 | DiFonzo et al. |
| 8,514,042 B2 | 8/2013 | Lauder et al. |
| 8,535,088 B2 | 9/2013 | Gao et al. |
| 8,576,031 B2 | 11/2013 | Lauder et al. |
| 8,576,034 B2 | 11/2013 | Bilbrey et al. |
| 8,616,362 B1 | 12/2013 | Browne et al. |
| 8,648,679 B2 | 2/2014 | Lauder et al. |
| 8,665,044 B2 | 3/2014 | Lauder et al. |
| 8,665,045 B2 | 3/2014 | Lauder et al. |
| 8,690,582 B2 | 4/2014 | Rohrbach et al. |
| 8,702,316 B2 | 4/2014 | DiFonzo et al. |
| 8,734,024 B2 | 5/2014 | Isenhour et al. |
| 8,752,200 B2 | 6/2014 | Varshavsky et al. |
| 8,757,893 B1 | 6/2014 | Isenhour et al. |
| 8,770,857 B2 | 7/2014 | DiFonzo et al. |
| 8,774,577 B2 | 7/2014 | Benjamin et al. |
| 8,781,273 B2 | 7/2014 | Benjamin et al. |
| 2002/0125977 A1 | 9/2002 | VanZoest |
| 2003/0136837 A1 | 7/2003 | Amon et al. |
| 2003/0170976 A1 | 9/2003 | Molla et al. |
| 2003/0179880 A1 | 9/2003 | Pan et al. |
| 2003/0187510 A1 | 10/2003 | Hyde |
| 2004/0003487 A1 | 1/2004 | Reiter |
| 2004/0244636 A1 | 12/2004 | Meadow et al. |
| 2004/0251759 A1 | 12/2004 | Hirzel |
| 2005/0102802 A1 | 5/2005 | Sitbon et al. |
| 2005/0196484 A1 | 9/2005 | Khoshnevis |
| 2005/0231046 A1 | 10/2005 | Aoshima |
| 2005/0240263 A1 | 10/2005 | Fogarty et al. |
| 2005/0263549 A1 | 12/2005 | Scheiner |
| 2005/0283839 A1 | 12/2005 | Cowburn |
| 2006/0066428 A1 | 3/2006 | McCarthy et al. |
| 2006/0189259 A1 | 8/2006 | Park et al. |
| 2006/0198047 A1 | 9/2006 | Xue et al. |
| 2006/0198998 A1 | 9/2006 | Raksha et al. |
| 2006/0214756 A1 | 9/2006 | Elliott et al. |
| 2006/0290451 A1 | 12/2006 | Prendergast et al. |
| 2006/0293762 A1 | 12/2006 | Schulman et al. |
| 2007/0072476 A1 | 3/2007 | Milan |
| 2007/0075594 A1 | 4/2007 | Sadler |
| 2007/0103266 A1 | 5/2007 | Wang et al. |
| 2007/0138806 A1 | 6/2007 | Ligtenberg et al. |
| 2007/0255400 A1 | 11/2007 | Parravinci et al. |
| 2007/0267929 A1 | 11/2007 | Pulnikov et al. |
| 2008/0119250 A1 | 5/2008 | Cho et al. |
| 2008/0139261 A1 | 6/2008 | Cho et al. |
| 2008/0174392 A1 | 7/2008 | Cho |
| 2008/0181804 A1 | 7/2008 | Tanigawa et al. |
| 2008/0186683 A1 | 8/2008 | Ligtenberg et al. |
| 2008/0218299 A1 | 9/2008 | Arnold |
| 2008/0224806 A1 | 9/2008 | Ogden et al. |
| 2008/0272868 A1 | 11/2008 | Prendergast et al. |
| 2008/0282517 A1 | 11/2008 | Claro |
| 2009/0021333 A1 | 1/2009 | Fiedler |
| 2009/0209173 A1 | 8/2009 | Arledge et al. |
| 2009/0250576 A1 | 10/2009 | Fullerton et al. |
| 2009/0251256 A1 | 10/2009 | Fullerton et al. |
| 2009/0254196 A1 | 10/2009 | Cox et al. |
| 2009/0278642 A1 | 11/2009 | Fullerton et al. |
| 2009/0289090 A1 | 11/2009 | Fullerton et al. |
| 2009/0289749 A1 | 11/2009 | Fullerton et al. |
| 2009/0292371 A1 | 11/2009 | Fullerton et al. |
| 2010/0033280 A1 | 2/2010 | Bird et al. |
| 2010/0126857 A1 | 5/2010 | Polwart et al. |
| 2010/0134916 A1 | 6/2010 | Kawabe |
| 2010/0167576 A1 | 7/2010 | Zhou |
| 2011/0026203 A1 | 2/2011 | Ligtenberg et al. |
| 2011/0051288 A1 | 3/2011 | Contreras |
| 2011/0085157 A1 | 4/2011 | Bloss et al. |
| 2011/0101088 A1 | 5/2011 | Marguerettaz et al. |
| 2011/0210636 A1 | 9/2011 | Kuhlmann-Wilsdorf |
| 2011/0234344 A1 | 9/2011 | Fullerton et al. |
| 2011/0248806 A1 | 10/2011 | Michael |
| 2011/0279206 A1 | 11/2011 | Fullerton et al. |
| 2012/0007704 A1 | 1/2012 | Nerl |
| 2012/0064309 A1 | 3/2012 | Kwon et al. |
| 2012/0085753 A1 | 4/2012 | Fitch et al. |
| 2012/0235519 A1 | 9/2012 | Dyer et al. |
| 2013/0186209 A1 | 7/2013 | Herbst |
| 2013/0186473 A1 | 7/2013 | Mankame et al. |
| 2013/0186807 A1 | 7/2013 | Browne et al. |
| 2013/0187638 A1 | 7/2013 | Herbst |
| 2013/0192860 A1 | 8/2013 | Puzio et al. |
| 2013/0207758 A1 | 8/2013 | Browne et al. |
| 2013/0252375 A1 | 9/2013 | Yi et al. |
| 2013/0256274 A1 | 10/2013 | Faulkner |
| 2013/0279060 A1 | 10/2013 | Nehl |
| 2013/0305705 A1 | 11/2013 | Ac et al. |
| 2013/0341137 A1 | 12/2013 | Mankame et al. |
| 2014/0001745 A1 | 1/2014 | Lehmann et al. |
| 2014/0044972 A1 | 2/2014 | Menassa et al. |
| 2014/0072261 A1 | 3/2014 | Isenhour et al. |
| 2014/0152252 A1 | 6/2014 | Wood et al. |
| 2014/0205235 A1 | 7/2014 | Benjamin et al. |
| 2014/0221741 A1 | 8/2014 | Wang et al. |

FOREIGN PATENT DOCUMENTS

| | | |
|---|---|---|
| EP | 0345554 | 12/1989 |
| EP | 0545737 A1 | 6/1993 |
| FR | 823395 A | 1/1938 |
| GB | 1495677 A | 12/1977 |
| JP | 54-152200 | 11/1979 |
| JP | S57-55908 A | 4/1982 |
| JP | S57-189423 A | 12/1982 |
| JP | 60091011 U | 5/1985 |
| JP | 60-221238 A | 11/1985 |
| JP | 64-30444 A | 2/1989 |
| JP | 2001-328483 A | 11/2001 |
| JP | 2008035676 A | 2/2008 |

(56) References Cited

FOREIGN PATENT DOCUMENTS

| JP | 2008165974 A | 7/2008 |
|---|---|---|
| JP | 05-038123 B2 | 10/2012 |
| WO | 02/31945 A2 | 4/2002 |
| WO | 2007/081830 A2 | 7/2007 |
| WO | 2009/124030 A1 | 10/2009 |
| WO | 2010/141324 A1 | 12/2010 |

OTHER PUBLICATIONS

United States Office Action issued in U.S. Appl. No. 13/530,893 dated Mar. 22, 2013.
United States Office Action issued in U.S. Appl. No. 13/530,893 dated Oct. 29, 2013.
United States Office Action issued in U.S. Appl. No. 13/718,839 dated Dec. 16, 2013.
United States Office Action issued in U.S. Appl. No. 13/855,519 dated Jul. 17, 2013.
United States Office Action issued in U.S. Appl. No. 13/928,126 dated Oct. 11, 2013.
United States Office Action, dated Aug. 26, 2011, issued in counterpart U.S. Appl. No. 12/206,270.
United States Office Action, dated Feb. 2, 2011, issued in counterpart U.S. Appl. No. 12/476,952.
United States Office Action, dated Mar. 12, 2012, issued in counterpart U.S. Appl. No. 12/206,270.
United States Office Action, dated Mar. 9, 2012, issued in counterpart U.S. Appl. No. 13/371,280.
United States Office Action, dated Oct. 12, 2011, issued in counterpart U.S. Appl. No. 12/476,952.
Wikipedia, "Barker Code", Web article, last modified Aug. 2, 2008, 2 pages.
Wikipedia, "Bitter Electromagnet", Web article, last modified Aug. 2011, 1 page.
Wikipedia, "Costas Array", Web article, last modified Oct. 7, 2008, 4 pages.
Wikipedia, "Gold Code", Web article, last modified Jul. 27, 2008, 1 page.
Wikipedia, "Golomb Ruler", Web article, last modified Nov. 4, 2008, 3 pages.
Wikipedia, "Kasami Code", Web article, last modified Jun. 11, 2008, 1 page.
Wikipedia, "Linear feedback shift register", Web article, last modified Nov. 11, 2008, 6 pages.
Wikipedia, "Walsh Code", Web article, last modified Sep. 17, 2008, 2 pages.
Atallah, K, Calverley, S.D., D. Howe, 2004, "Design, analysis and realisation of a high-performance magnetic gear", IEE Proc.-Electr. Power Appl., vol. 151, No. 2, Mar. 2004.
Atallah, K., Howe, D. 2001, "A Novel High-Performance Magnetic Gear", IEEE Transactions on Magnetics, vol. 37, No. 4, Jul. 2001, p. 2844-46.
Bassani, R., 2007, "Dynamic Stability of Passive Magnetic Bearings", Nonlinear Dynamics, V. 50, p. 161-68.
"BNS 33 Range, Magnetic safety sensors, Rectangular design, http://www.farnell.com/datasheets/36449.pdf, 3 pages, date unknown.".
"Boston Gear 221S-4, One-stage Helical Gearbox, http://www.bostongearcom/pdf/product_sections/200_series_helical.pdf, referenced Jun. 2010".
Charpentier et al., 2001, "Mechanical Behavior of Axially Magnetized Permanent-Magnet Gears", IEEE Transactions on Magnetics, vol. 37, No. 3, May 2001, p. 1110-17.
Chau et al., 2008, "Transient Analysis of Coaxial Magnetic Gears Using Finite Element Comodeling", Journal of Applied Physics, vol. 103.
Choi et al., 2010, "Optimization of Magnetization Directions in a 3-D Magnetic Structure", IEEE Transactions on Magnetics, vol. 46, No. 6, Jun. 2010, p. 1603-06.
Correlated Magnetics Research, 2009, Online Video, "Innovative Magnetics Research in Huntsville", http://www.youtube.com/watch?v=m4m81JjZCJo.
Correlated Magnetics Research, 2009, Online Video, "Non-Contact Attachment Utilizing Permanent Magnets", http://www.youtube.com/watch?v=3xUm25CNNgQ.
"Correlated Magnetics Research, 2010, Company Website, http://www.correlatedmagnetics.com".
Furlani 1996, "Analysis and optimization of synchronous magnetic couplings", J. Appl. Phys., vol. 79, No. 8, p. 4692.
Furlani 2001, "Permanent Magnet and Electromechanical Devices", Academic Press, San Diego.
Furlani, E.P., 2000, "Analytical analysis of magnetically coupled multipole cylinders", J. Phys. D: Appl. Phys., vol. 33, No. 1, p. 28-33.
General Electric DP 2.7 Wind Turbine Gearbox, http://www.gedrivetrain.com/insideDP27.cfm, referenced Jun. 2010.
Ha et al., 2002, "Design and Characteristic Analysis of Non-Contact Magnet Gear for Conveyor by Using Permanent Magnet", Conf. Record of the 2002 IEEE Industry Applications Conference, p. 1922-27.
Huang et al., 2008, "Development of a Magnetic Planetary Gearbox", IEEE Transactions on Magnetics, vol. 44, No. 3, p. 403-12.
International Search Report and Written Opinion dated Jun. 1, 2009, directed to counterpart application No. PCT/US2009/002027. (10 pages).
International Search Report and Written Opinion of the International Searching Authority issued in Application No. PCT/US12/61938 dated Feb. 26, 2013.
International Search Report and Written Opinion of the International Searching Authority issued in Application No. PCT/US2013/028095 dated May 13, 2013.
International Search Report and Written Opinion of the International Searching Authority issued in Application No. PCT/US2013/047986 dated Nov. 21, 2013.
International Search Report and Written Opinion, dated Apr. 8, 2011 issued in related International Application No. PCT/US2010/049410.
International Search Report and Written Opinion, dated Aug. 18, 2010, issued in related International Application No. PCT/US2010/036443.
International Search Report and Written Opinion, dated Jul. 13, 2010, issued in related International Application No. PCT/US2010/021612.
International Search Report and Written Opinion, dated May 14, 2009, issued in related International Application No. PCT/U52009/038925.
Jian et al., "Comparison of Coaxial Magnetic Gears With Different Topologies", IEEE Transactions on Magnetics, vol. 45, No. 10, Oct. 2009, p. 4526-29.
Jian, L., Chau, K.T., 2010, "A Coaxial Magnetic Gear With Halbach Permanent-Magnet Arrays", IEEE Transactions on Energy Conversion, vol. 25, No. 2, Jun. 2010, p. 319-28.
Jorgensen et al., "The Cycloid Permanent Magnetic Gear", IEEE Transactions on Industry Applications, vol. 44, No. 6, Nov./Dec. 2008, p. 1659-65.
Jorgensen et al., 2005, "Two dimensional model of a permanent magnet spur gear", Conf. Record of the 2005 IEEE Industry Applications Conference, p. 261-5.
Kim, "A future cost trends of magnetizer systems in Korea", Industrial Electronics, Control, and Instrumentation, 1996, vol. 2, Aug. 5, 1996, pp. 991-996.
Krasil'nikov et al., 2008, "Calculation of the Shear Force of Highly Coercive Permanent Magnets in Magnetic Systems With Consideration of Affiliation to a Certain Group Based on Residual Induction", Chemical and Petroleum Engineering, vol. 44, Nos. 7-8, p. 362-65.
Krasil'nikov et al., 2009, "Torque Determination for a Cylindrical Magnetic Clutch", Russian Engineering Research, vol. 29, No. 6, pp. 544-547.
Liu et al., 2009, "Design and Analysis of Interior-magnet Outer-rotor Concentric Magnetic Gears", Journal of Applied Physics, vol. 105.
Lorimer, W., Hartman, A., 1997, "Magnetization Pattern for Increased Coupling in Magnetic Clutches", IEEE Transactions on Magnetics, vol. 33, No. 5, Sep. 1997.

(56) References Cited

OTHER PUBLICATIONS

Mezani, S., Atallah, K., Howe, D., 2006, "A high-performance axial-field magnetic gear", Journal of Applied Physics vol. 99.

MI, "Magnetreater/Charger Model 580" Magnetic Instruments Inc. Product specification, May 4, 2009, http://web.archive.org/web/20090504064511/http://www.maginst.com/specifications/580_mag netreater.htm, 2 pages.

Neugart PLE-160, One-Stage Planetary Gearbox, http://www.neugartusa.com/ple_160_gb.pdf, referenced Jun. 2010.

"Series BNS, Compatible Series AES Safety Controllers, http://www.schmersalusa.com/safety_controllers/drawingskes.Pdf, pp. 159-175, date unknown.".

Series BNS-B20, Coded-Magnet Sensor Safety Door Handle, http://www.schmersalusa.com/catalog_pdfs/BNS_B20.pdf, 2pages, date unknown.

Series BNS333, Coded-Magnet Sensors with Integral Safety Control Module, http://www.schmersalusa.com/machine_guarding/coded_magnet/drawings/bns333.pdf, 2 pages, date unknown.

Tsurumoto 1992, "Basic Analysis on Transmitted Force of Magnetic Gear Using Permanent Magnet", IEEE Translation Journal on Magnetics in Japan, Vo 7, No. 6, Jun. 1992, p. 447-52.

United States Office Action issued in U.S. Appl. No. 13/104,393 dated Apr. 4, 2013.

United States Office Action issued in U.S. Appl. No. 13/236,413 dated Jun. 6, 2013.

United States Office Action issued in U.S. Appl. No. 13/246,584 dated May 16, 2013.

United States Office Action issued in U.S. Appl. No. 13/246,584 dated Oct. 15, 2013.

United States Office Action issued in U.S. Appl. No. 13/374,074 dated Feb. 21, 2013.

United States Office Action issued in U.S. Appl. No. 13/430,219 dated Aug. 13, 2013.

United States Office Action issued in U.S. Appl. No. 13/470,994 dated Aug. 8, 2013.

United States Office Action issued in U.S. Appl. No. 13/470,994 dated Jan. 7, 2013.

United States Office Action issued in U.S. Appl. No. 13/470,994 dated Nov. 8, 2013.

\* cited by examiner

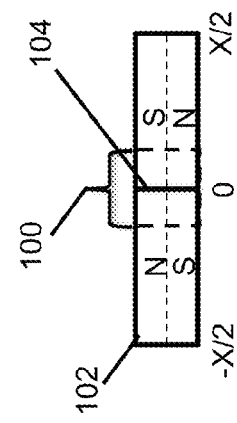
FIG. 1A (Top View)
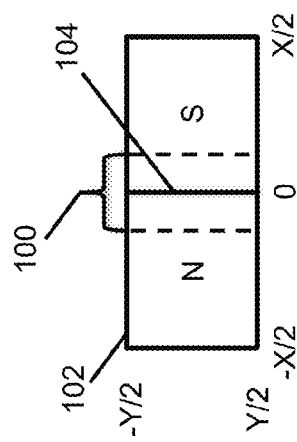
FIG. 1B (Side View)
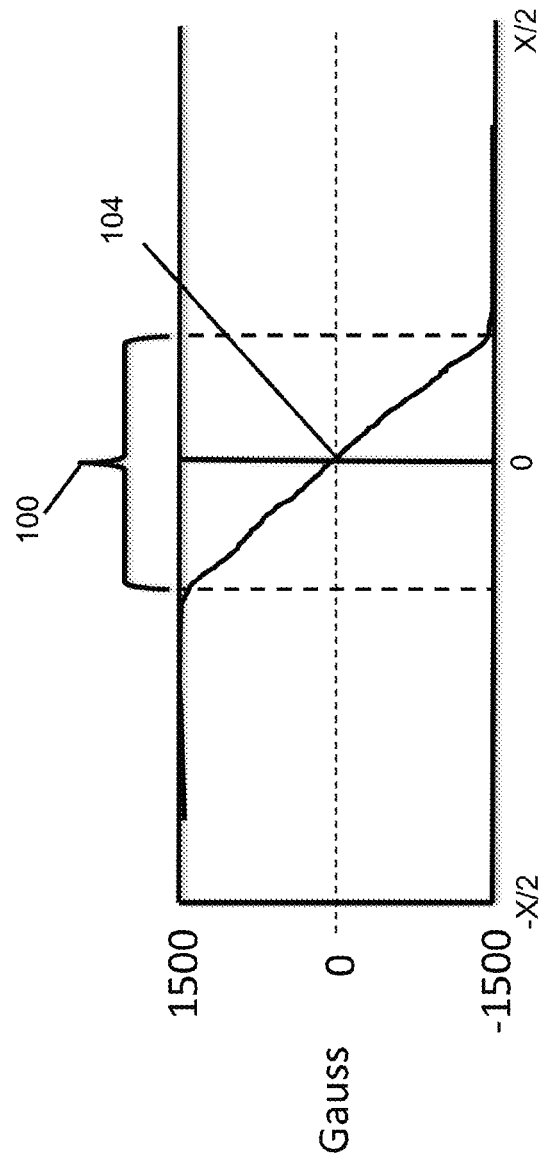
FIG. 1C

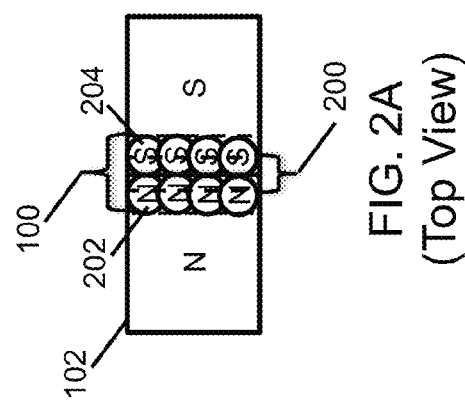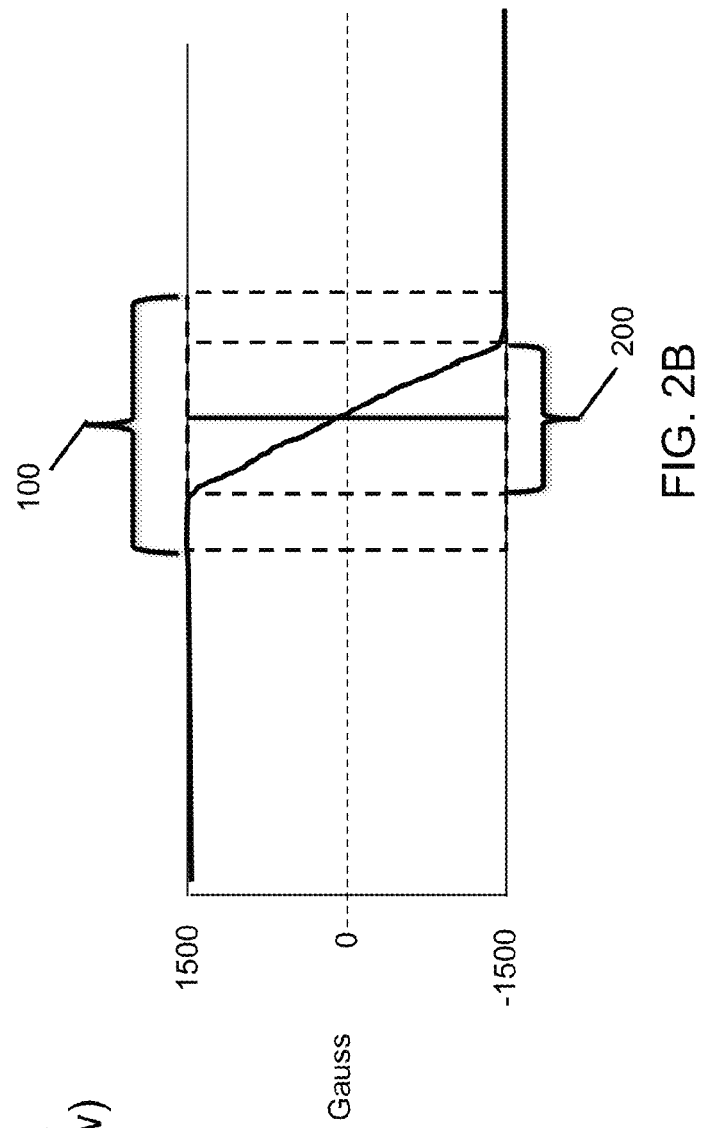

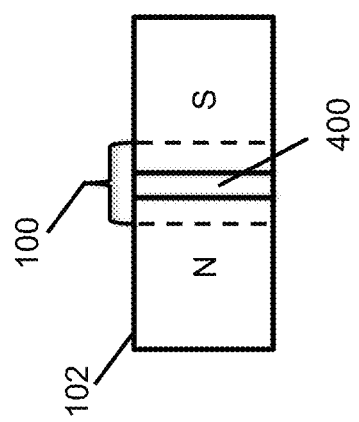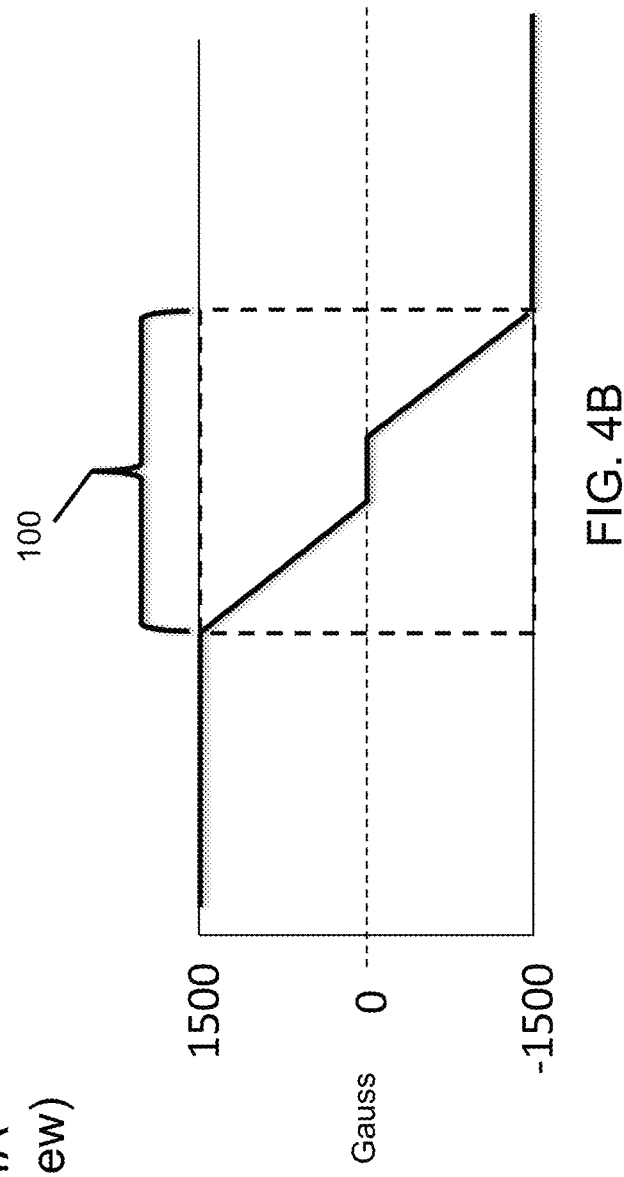
FIG. 4A (Top View)
FIG. 4B

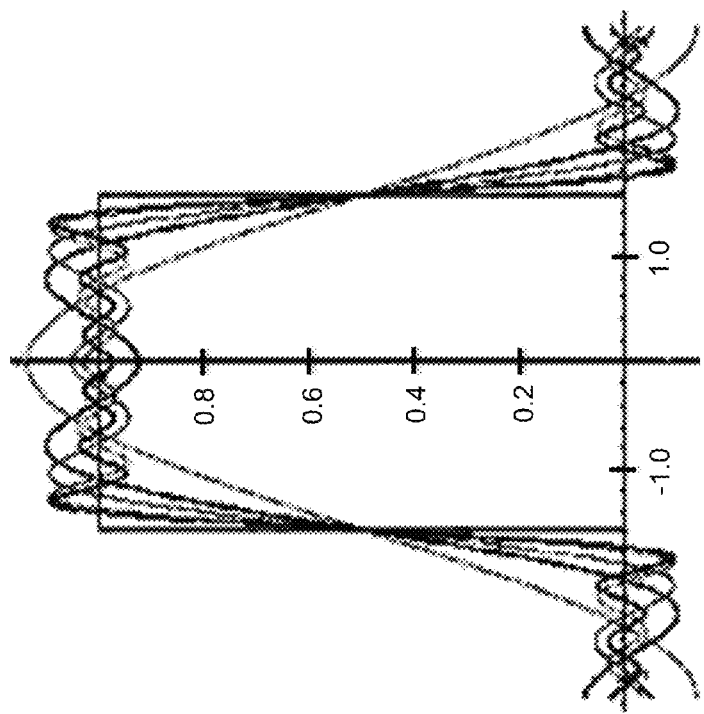
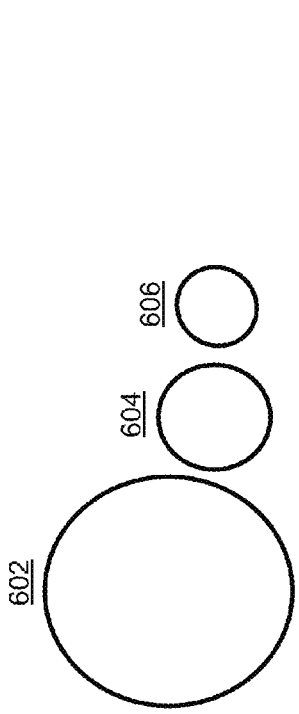
FIG. 6A
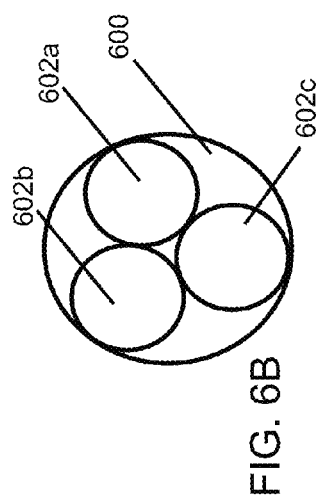
FIG. 6B
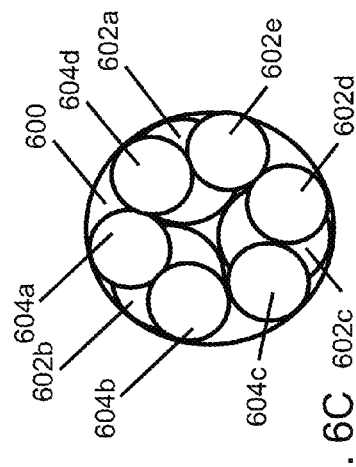
FIG. 6C
FIG. 6D

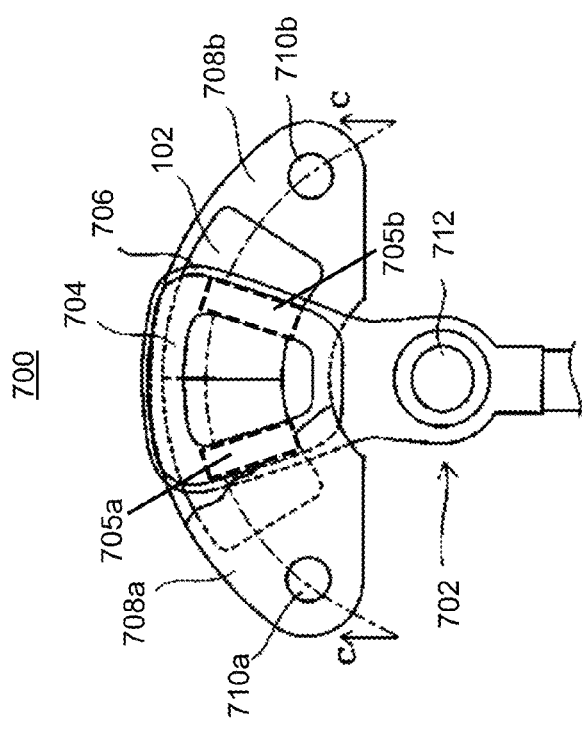
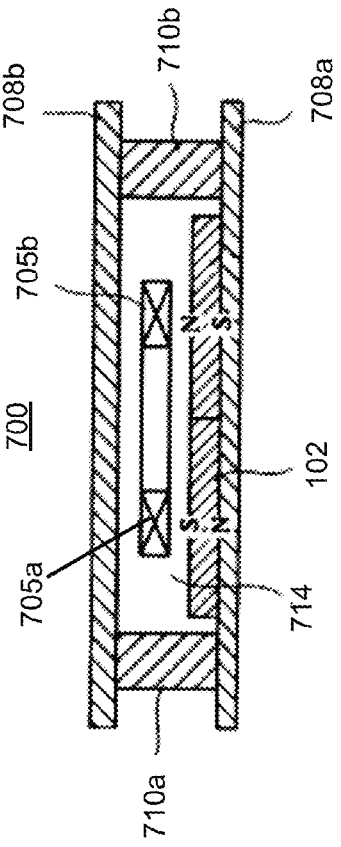
FIG. 7A (Top View)
FIG. 7B (Side View)

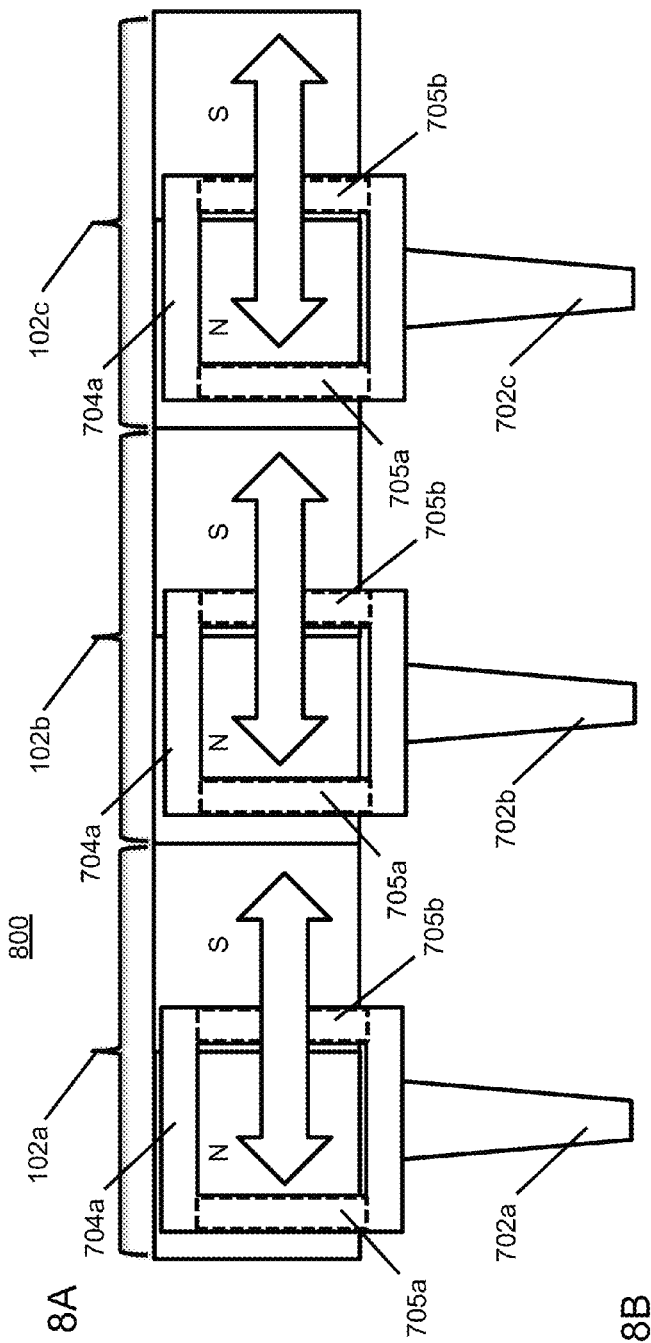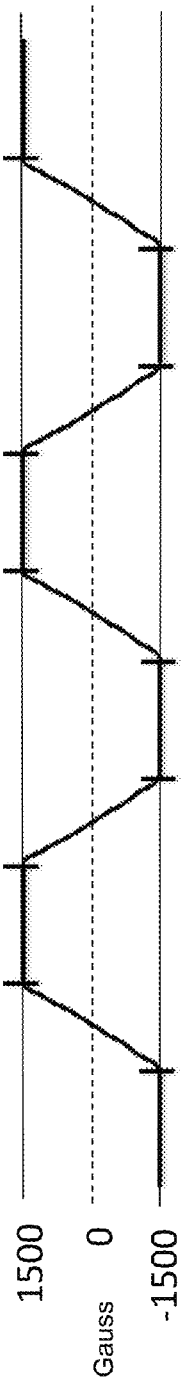

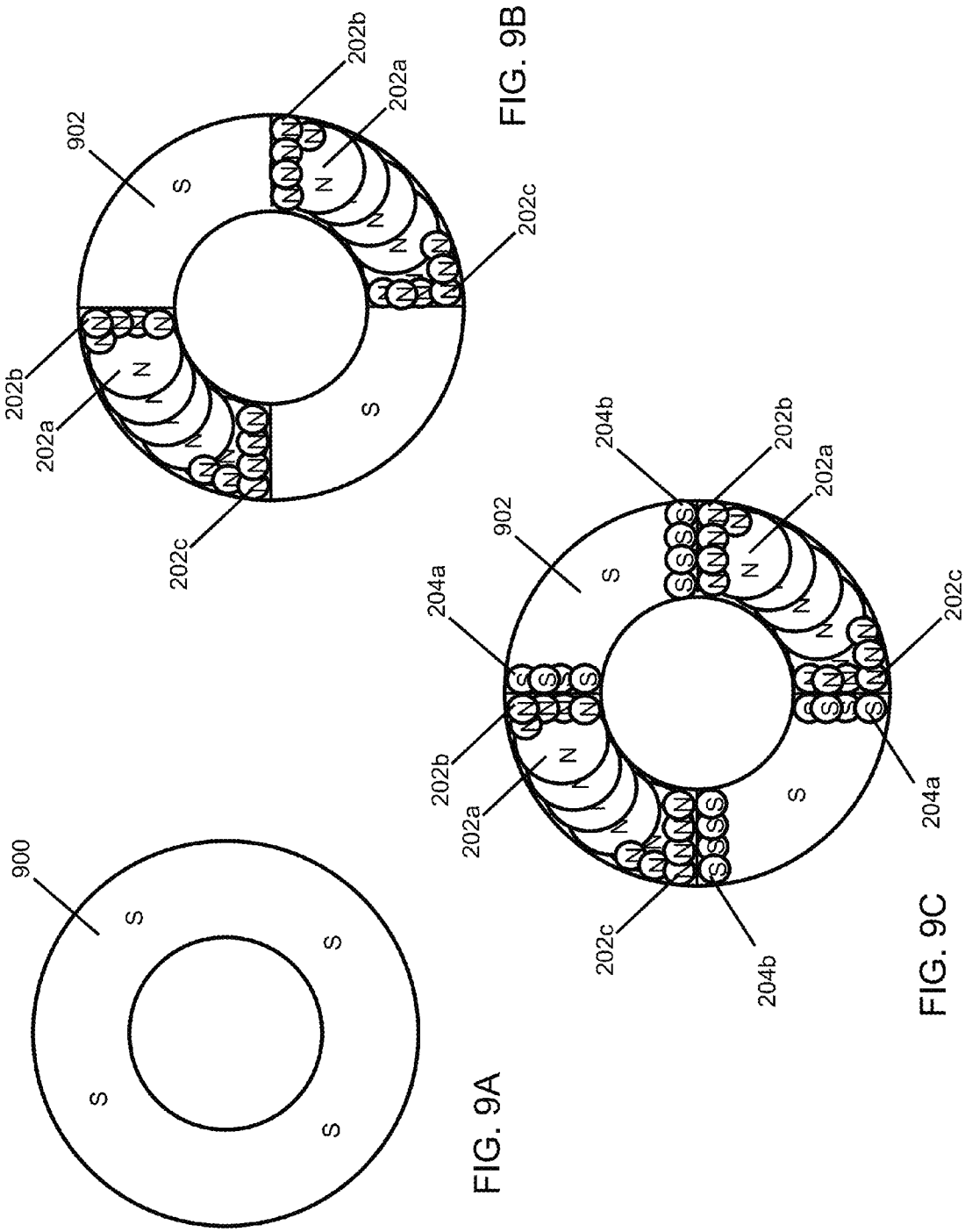

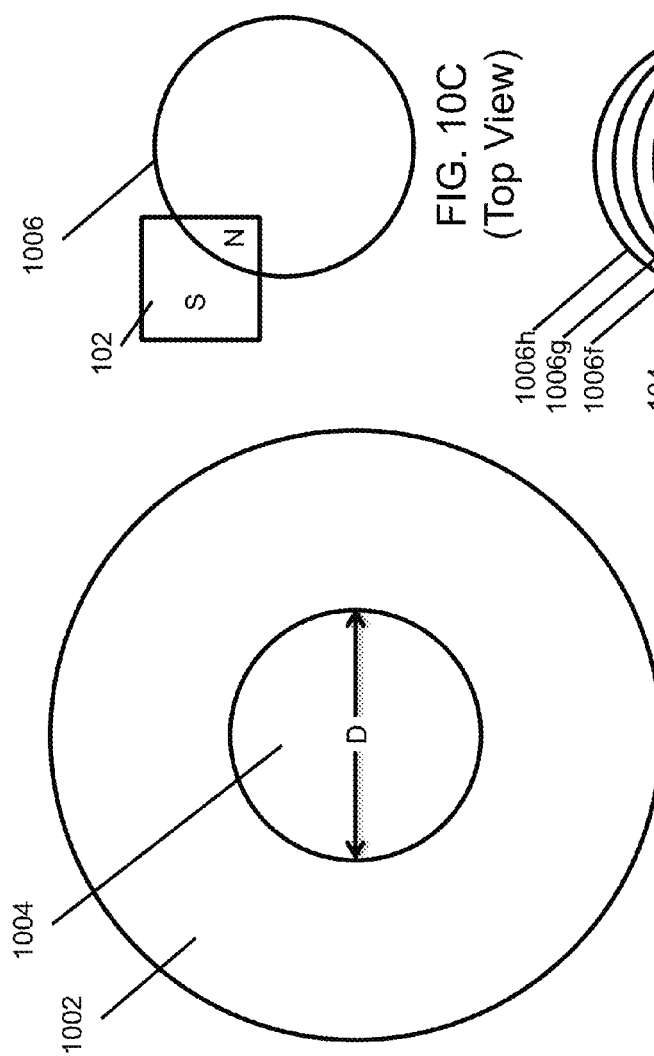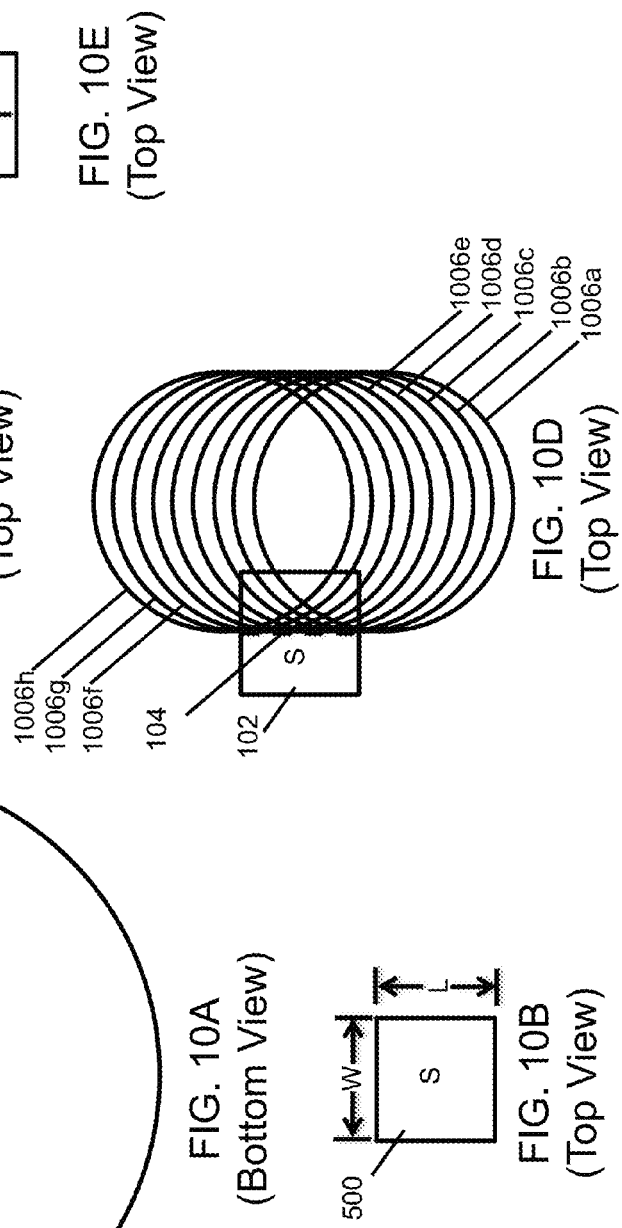

(Top View)

(Top View)

(Top View)

(Top View)

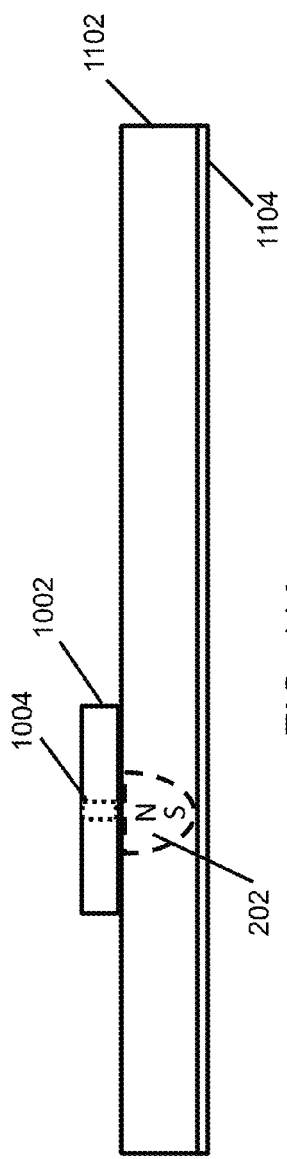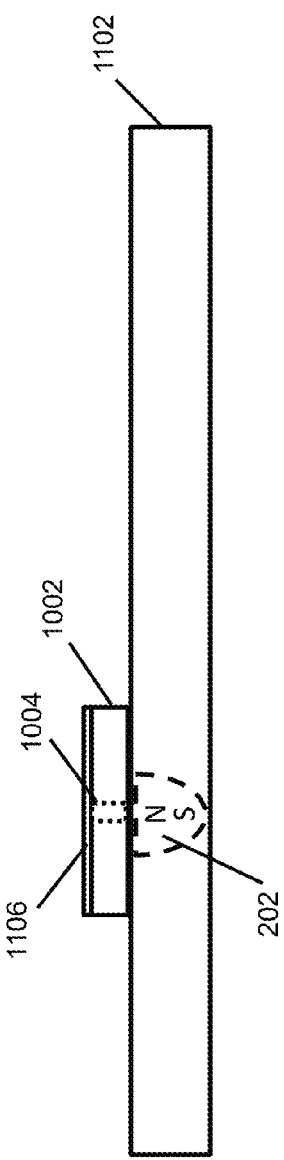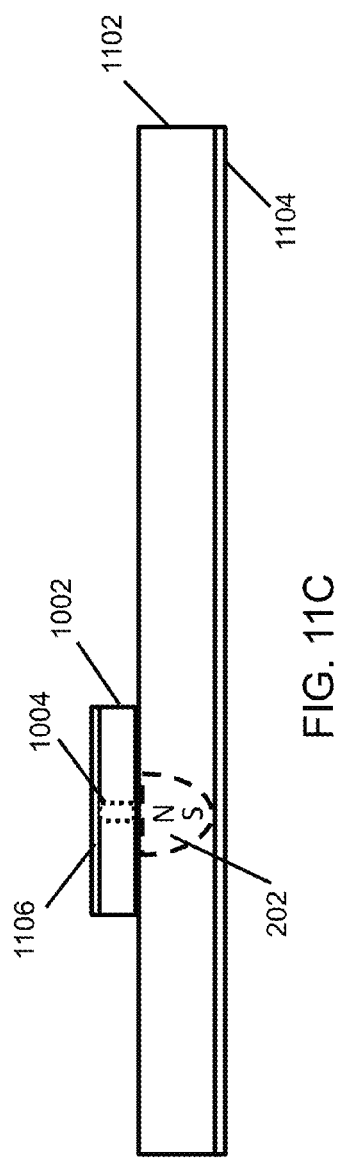

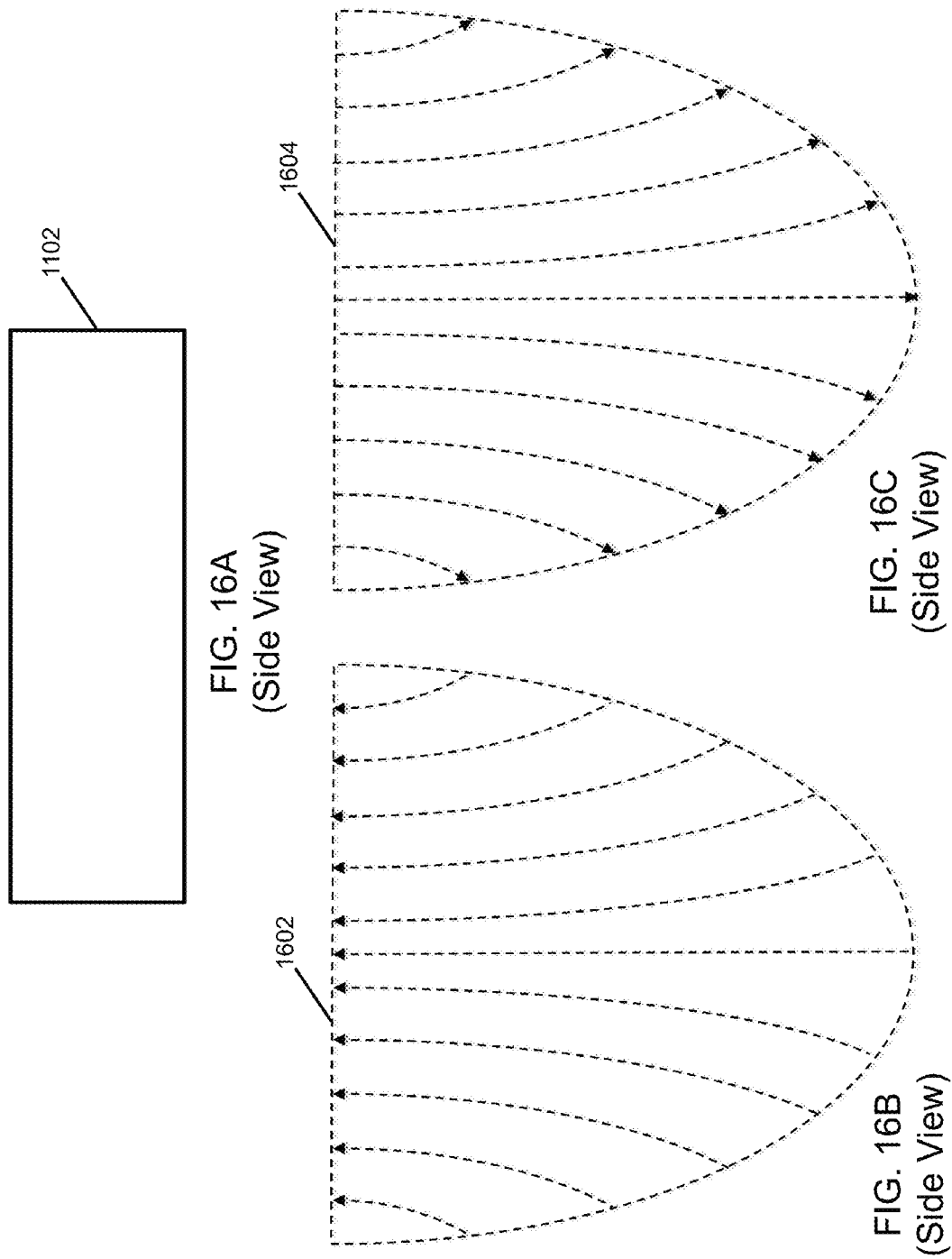

(Side View)

(Side View)

(Side View)

(Side View)

SYSTEM AND METHOD FOR TAILORING POLARITY TRANSITIONS OF MAGNETIC STRUCTURES

CLAIMING BENEFIT OF PRIOR FILED U.S. APPLICATIONS

This Nonprovisional Patent Application claims the benefit of U.S. Provisional Patent Application No. 62/022,092 (filed Jul. 8, 2014), which is entitled "SYSTEM AND METHOD FOR TAILORING POLARITY TRANSITIONS OF MAGNETIC STRUCTURES"; and this Nonprovisional Patent Application is a continuation-in-part of U.S. Nonprovisional patent application Ser. No. 14/045,756 (filed Oct. 3, 2013), which is entitled "SYSTEM AND METHOD FOR TAILORING POLARITY TRANSITIONS OF MAGNETIC STRUCTURES", which claims the benefit of U.S. Provisional Patent Application No. 61/744,864 (filed Oct. 4, 2012), which is entitled "SYSTEM AND METHOD FOR TAILORING POLARITY TRANSITIONS OF MAGNETIC STRUCTURES"; Ser. No. 14/045,756 is a continuation-in-part of U.S. Nonprovisional patent application Ser. No. 13/240,335 (filed Sep. 22, 2011), which is entitled "MAGNETIC STRUCTURE PRODUCTION", which claims the benefit of U.S. Provisional Patent Application No. 61/403,814 (filed Sep. 22, 2010) and U.S. Provisional Patent Application No. 61/462,715 (filed Feb. 7, 2011), both of which are entitled "SYSTEM AND METHOD FOR PRODUCING MAGNETIC STRUCTURES"; Ser. No. 13/240,335 is a continuation-in-part of Nonprovisional U.S. Pat. No. 8,179,219 (issued May 15, 2012), which is entitled "FIELD EMISSION SYSTEM AND METHOD"; Ser. No. 13/240,335 is also a continuation-in-part of U.S. Nonprovisional patent application Ser. No. 12/895,589 (filed Sep. 30, 2010), which is entitled "A SYSTEM AND METHOD FOR ENERGY GENERATION", which claims the benefit of Provisional Patent Application Nos. 61/277,214 (filed Sep. 22, 2009), 61/277,900 (filed Sep. 30, 2009), 61/278,767 (filed Oct. 9, 2009), 61/279,094 (filed Oct. 16, 2009), 61/281,160 (filed Nov. 13, 2009), 61/283,780 (filed Dec. 9, 2009), 61/284,385 (filed Dec. 17, 2009) and 61/342,988 (filed Apr. 22, 2010); Ser. No. 12/895,489 is a continuation-in-part of Nonprovisional U.S. Pat. No. 7,982,568 (issued Jul. 19, 2011) and U.S. Pat. No. 8,179,219 (issued May 15, 2012); 14/045,756 is also a continuation-in-part of U.S. patent application Ser. No. 13/246,584, filed Sep. 27, 2011, which is entitled "System and Method for Producing Stacked Field Emission Structures". The contents of the provisional patent applications, the contents of the nonprovisional patent applications, and the contents of the issued patents that are identified above are hereby incorporated by reference in their entirety herein.

FIELD OF THE INVENTION

The present invention relates generally to a system and method for tailoring polarity transitions of multiple pole magnetic structures. More particularly, the present invention relates to tailoring polarity transitions of multiple pole magnetic structures by spot magnetizing on one or more sides of polarity transition boundaries.

SUMMARY OF THE INVENTION

In accordance with one aspect of the invention, a magnetic structure having

BRIEF DESCRIPTION OF THE DRAWINGS

A more complete understanding of described embodiments may be obtained by reference to the following detailed description when taken in conjunction with the accompanying drawings wherein:

FIG. 1A depicts a top view of an exemplary axially magnetized conventional multiple pole magnet having a North polarity side and South polarity side that are separated by a polarity transition boundary;

FIG. 1B depicts a side view of the exemplary multiple pole magnet of FIG. 1A;

FIG. 1C depicts an exemplary magnetic field cross section of the multiple pole magnet of FIGS. 1A and 1B;

FIG. 2A depicts a top view of exemplary reinforcing North polarity maxels and exemplary reinforcing South polarity maxels printed alongside the polarity transition boundary;

FIG. 2B depicts an exemplary magnetic field cross section of the multiple pole magnet of FIG. 2A after printing of reinforcing maxels;

FIG. 4A depicts a top view of an exemplary axially magnetized conventional multiple pole magnet having a North polarity side and South polarity side that are separated by a non-magnetized area;

FIG. 4B depicts an exemplary magnetic field cross section of the multiple pole magnet of FIG. 4A;

FIGS. 6A-6C depict three exemplary maxel sizes and the printing of patterns of different sizes of maxels within an area;

FIG. 6D depicts an exemplary radio frequency pulse produced by combining harmonics of radio frequency sine wave signals;

FIGS. 7A and 7B depict top and side views of an exemplary voice coil assembly;

FIG. 8A depicts a top view of an exemplary voice coil assembly comprising multiple voice coils interacting with a multiple pole magnet having six polarity regions;

FIGS. 8B and 8C depict exemplary magnetic field cross sections of the multiple pole magnet of FIG. 8A before and after reinforcing maxels have been printed alongside transition boundaries;

FIG. 9A depicts the South polarity side of an exemplary conventional single pole magnet;

FIG. 9B depicts an exemplary multiple pole magnet produced by printing patterns of maxels including reinforcing maxels onto portions of the single pole magnet of FIG. 9A;

FIG. 9C depicts printing of reinforcing maxels on the South polarity sides of the four polarity transition boundaries of the multiple pole magnet of FIG. 9B;

FIG. 10A depicts a bottom view of an exemplary circular print head;

FIG. 10B depicts a top view of the South polarity side of an exemplary conventional magnet;

FIG. 10C depicts a magnetizing field overlapping a portion of the magnet causing that portion to be magnetized to have a North polarity and thereby be converted to a multi pole magnet;

FIG. 10D depicts a sequence of magnetizing fields used to magnetize half of the magnet so as to create a polarity transition boundary;

FIG. 10E depicts the multi pole magnet after being exposed to the magnetizing fields of FIG. 10D;

FIG. 11A depicts an example magnetizable material backing layer that is beneath and at a magnetizable material with a maxel being printed by a print head;

FIG. 11B depicts an example print head backing layer placed on a "back" side of a print head placed against a magnetizable material when printing a maxel;

FIG. 11C depicts printing of a maxel onto a magnetizable material having a magnetizable material backing layer using a print head having a print head backing layer;

FIGS. 16A through 16D depict magnetization of a material using a first magnetizing field having a first magnetization direction and a second magnetizing field having a second magnetization direction that is opposite the first magnetization direction;

DETAILED DESCRIPTION OF THE INVENTION

Figure 3B:
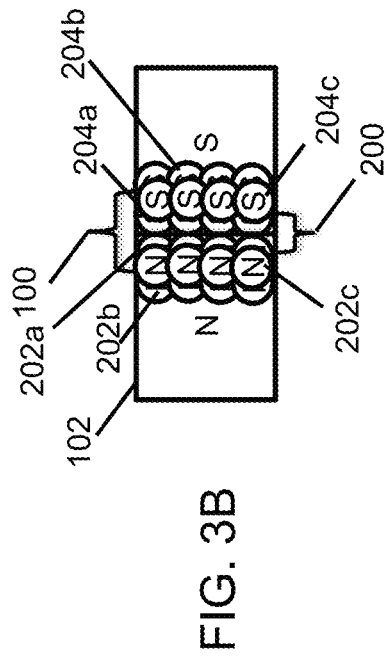
FIGS. 3A-3D present various exemplary patterns of reinforcing maxels.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art.

The present invention pertains to a system and method for tailoring polarity transitions of multiple pole magnetic structures (i.e., multiple pole magnets). Multiple pole structures have two or more polarity regions on the same side (or surface) of material, where one skilled in the art will recognize that multiple pole structures are generally intended to replace combinations of single pole magnets that have only one polarity region on a given side of material. Certain described embodiments may relate, by way of example but not limitation, to systems and/or apparatuses comprising magnetic structures, methods for using magnetic structures, magnetic structures produced via magnetic printing, magnetic structures comprising arrays of discrete magnetic elements, combinations thereof, and so forth. Example realizations for such embodiments may be facilitated, at least in part, by the use of an emerging, revolutionary technology that may be termed correlated magnetics. This revolutionary technology referred to herein as correlated magnetics was first fully described and enabled in the co-assigned U.S. Pat. No. 7,800,471 issued on Sep. 21, 2010, and entitled "A Field Emission System and Method". The contents of this document are hereby incorporated herein by reference. A second generation of a correlated magnetic technology is described and enabled in the co-assigned U.S. Pat. No. 7,868,721 issued on Jan. 11, 2011, and entitled "A Field Emission System and Method". The contents of this document are hereby incorporated herein by reference. A third generation of a correlated magnetic technology is described and enabled in the co-assigned U.S. Pat. No. 8,179,219 issued on May 15, 2012, and entitled "A Field Emission System and Method". The contents of this document are hereby incorporated herein by reference. Another technology known as correlated inductance, which is related to correlated magnetics, has been described and enabled in the co-assigned U.S. Pat. No. 8,115,581 issued on Feb. 14, 2012, and entitled "A System and Method for Producing an Electric Pulse". The contents of this document are hereby incorporated by reference.

Material presented herein may relate to and/or be implemented in conjunction with multilevel correlated magnetic systems and methods for producing a multilevel correlated magnetic system such as described in U.S. Pat. No. 7,982,568 issued Jul. 19, 2011 which is all incorporated herein by reference in its entirety. Material presented herein may relate to and/or be implemented in conjunction with energy generation systems and methods such as described in U.S. Pat. No. 8,760,250 issue Jun. 24, 2014, which is all incorporated herein by reference in its entirety. Such systems and methods described in U.S. Pat. No. 7,681,256 issued Mar. 23, 2010, U.S. Pat. No. 7,750,781 issued Jul. 6, 2010, U.S. Pat. No. 7,755,462 issued Jul. 13, 2010, U.S. Pat. No. 7,812,698 issued Oct. 12, 2010, U.S. Pat. Nos. 7,817,002, 7,817,003, 7,817,004, 7,817,005, and 7,817,006 issued Oct. 19, 2010, U.S. Pat. No. 7,821,367 issued Oct. 26, 2010, U.S. Pat. Nos. 7,823,300 and 7,824,083 issued Nov. 2, 2011, U.S. Pat. No. 7,834,729 issued Nov. 16, 2011, U.S. Pat. No. 7,839,247 issued Nov. 23, 2010, U.S. Pat. Nos. 7,843,295, 7,843,296, and 7,843,297 issued Nov. 30, 2010, U.S. Pat. No. 7,893,803 issued Feb. 22, 2011, U.S. Pat. Nos. 7,956,711 and 7,956,712 issued Jun. 7, 2011, U.S. Pat. Nos. 7,958,575, 7,961,068 and 7,961,069 issued Jun. 14, 2011, U.S. Pat. No. 7,963,818 issued Jun. 21, 2011, and U.S. Pat. Nos. 8,015,752 and 8,016,330 issued Sep. 13, 2011, and U.S. Pat. No. 8,035,260 issued Oct. 11, 2011 are all incorporated by reference herein in their entirety.

In accordance with the present invention, a polarity transition (or transition region) between two conventionally magnetized opposite polarity regions of a multiple pole magnet is tailored by printing a defined pattern of one or more 'reinforcing' magnetic sources called maxels alongside a polarity transition boundary in the transition region to change the magnetic field characteristics across the transition region, for example, to produce a steeper transition slope. FIG. 1A depicts a top view of a transition region 100 between two opposite polarity poles of a conventionally magnetized multiple pole magnetic structure (or multiple pole magnet) 102. A transition region corresponds to the area of the magnetic structure where a magnetic field transitions from a North polarity to a South polarity (or vice versa). As shown, the multiple pole magnet 102 has two halves where the top of one half has a North polarity region and the top of the other half has a South polarity region. FIG. 1B depicts a side view of the same multiple pole magnet 102 shown in FIG. 1A. As shown in FIG. 1B, the multiple pole magnet 102 has two halves, where the left half has a North polarity region on top of a South polarity region and the right half has a South polarity region on top of a North polarity region. The magnitude of the magnetic field across a transition region 100 corresponds to a portion of a magnetic field cross section curve such as depicted in FIG. 1C that can be represented by a sloped line that crosses zero at a polarity transition boundary when polarity changes (or transitions). The magnetic field cross section may correspond to magnetic field measurements taken across the multiple pole magnet, which might be measurements taken along a line parallel to the surface of the magnet from $-X/2$ to $X/2$ with a constant Y value (e.g., 0) and a constant Z value (e.g., substantially near the surface of the multiple pole magnet 102). The peak amplitudes of $+/-1500$ Gauss used in FIG. 1C and other similar plots that follow were arbitrarily selected. One skilled in the art will understand that the portion of the magnetic field cross section that corresponds to the polarity transition will have a curve that begins at a first point corresponding to a first polarity field strength, crosses the polarity transition boundary (i.e., 0 field strength) and ends at a second point corresponding to a second polarity field strength, where the measured curve may be a line or some other shape but which can be otherwise approximated by a line going from the first point through zero to the second point, where the magnitudes of the field strengths may be substantially the same or may be substantially different.

For certain applications, a shallow slope may represent wasted magnetic energy because the transition region has a weaker magnetic field than outside the transition region. For example, a voice coil relies on the interaction between current running through a copper coil situated in an air gap above a magnet and the field lines extending from the face of the magnet. The transition region essentially creates a weaker area in the middle of the magnetic structure (i.e., a dead zone) in which the desired field interaction with the copper coil is much weaker than in those areas outside the transition region. Minimizing the transition region by creating a steeper slope means that more of the magnetic structure is providing a force sufficient to move the actuator arm. A voice coil having a transition region with a steeper slope will more efficiently use magnetic material, may have higher torque, and may be able to use a smaller coil to achieve comparable performance.

Reinforcing maxels printed in the transition region may comprise a plurality of round maxels of the same polarity printed next to each other (e.g., in a row) or partially overlapping each other. Alternatively, a reinforcing maxel may have an elongated shape such as a rectangular shape. FIG. 2A depicts a first row of North polarity reinforcing maxels 202 printed on the left side of the polarity transition boundary of the pre-reinforcement transition region and a second row of South polarity reinforcing maxels 204 printed on the right side of the polarity transition boundary of the pre-reinforcement transition region, where the objective is to produce a reinforced transition region in a magnetic field cross section such as depicted in FIG. 2B that has a steeper slope than the pre-reinforcement transition region.

Figure 3D:
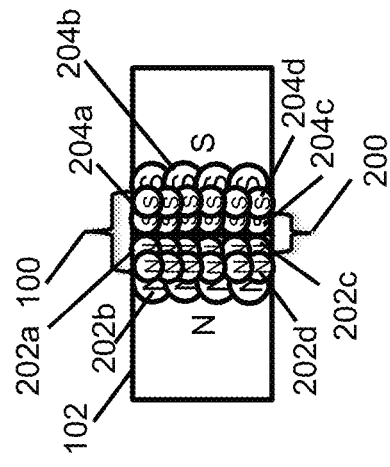
Figure 3A:
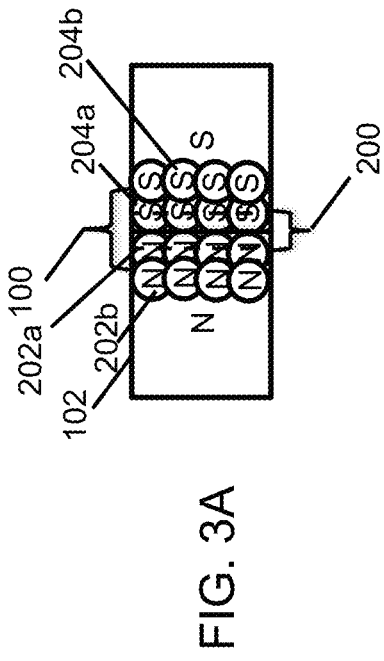
Figure 3C:
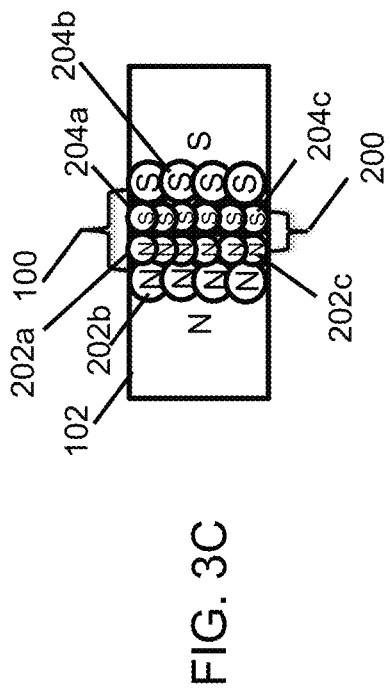

FIGS. 3A-3D show various approaches for printing reinforcing maxels in order to tailor the magnetic field across a transition region. In FIG. 3A, two overlapping rows of North polarity maxels 202a 202b and two overlapping rows of South polarity maxels 204a 204b are shown. In FIG. 3B, an additional row of North polarity maxels 202c and an additional row of South polarity maxels 204c are added to the rows shown in FIG. 3A. In FIG. 3C, rows of smaller North maxels 202c and South polarity maxels 204c are printed over the inner most rows of North maxels 202b and South polarity maxels 204b shown in FIG. 3A. In FIG. 3D, an additional row of smaller North polarity maxels 202d and an additional row of smaller South polarity maxels 204d are added to the rows shown in FIG. 3C. Generally, one skilled in the art will recognize that reinforcing maxels of a given polarity can have different sizes and shapes, can be overlapped in various ways, and can be amplitude modulated on a maxel-by-maxel basis to produce desired magnetic field characteristics across a transition region. Reinforcing maxels can be produced by printing only on one side of a piece of magnetizable material or by printing on opposing sides of a piece of magnetizable material. Various techniques for printing maxels are described in pending U.S. patent application Ser. No. 13/240,355, filed Sep. 22, 2011, and titled "Magnetic Structure Production".

In accordance with one aspect of the invention, reinforcing maxels can be printed with different magnetization directions other than directions perpendicular to the surface of a magnetizable material. For example, Referring to FIG. 2A, reinforcing maxels near the outer edges of the magnetic material could be printed such that North polarity maxels pointed inward and South polarity maxels pointed outward (i.e., away from the material). As such, in addition to the various other maxel characteristics that can be varied as described previously, the magnetization direction can also be varied on a maxel-by-maxel basis to achieve desired magnetic field characteristics across a transition region. Printing with different magnetization directions is described in pending U.S. patent application Ser. No. 13/246,584, filed Sep. 27, 2011, and titled "System and Method for Producing Stacked Field Emission Structures."

One skilled in the art will recognize that subsequent magnetization of a previously magnetized material can involve a method of: a) sensing a magnetic field, b) determining magnetization events to tailor the field and then c) performing the magnetization events, which is a process that can be repeated as necessary to meet established one or more criterion (e.g., a transition slope).

A conventional magnet may be magnetized such that a transition region includes a non-magnetized area between North and South polarity areas such as shown in FIG. 4A. Under such an arrangement, reinforcing maxels can be printed to magnetize the non-magnetized area and produce a reinforced magnet transition region such as shown in FIG. 2A. A magnetic field cross section of the magnet of FIG. 4A is depicted in FIG. 4B.

Figure 5B:
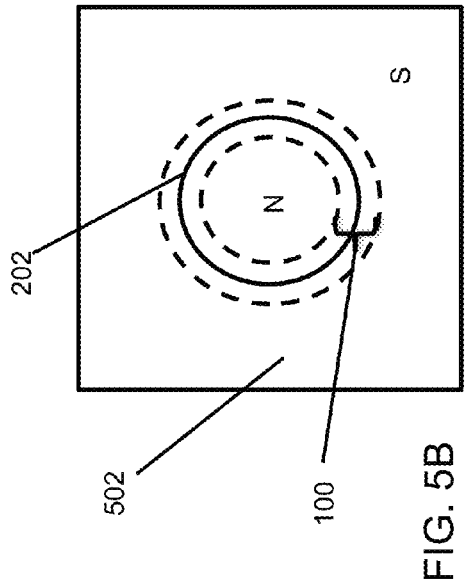
FIG. 5B depicts an exemplary multiple pole magnet produced by printing a North polarity maxel on the South polarity side of a conventional single pole magnet and a corresponding polarity transition about the polarity transition boundary between the North and South polarity portions of the multiple pole magnet.
Figure 5D:
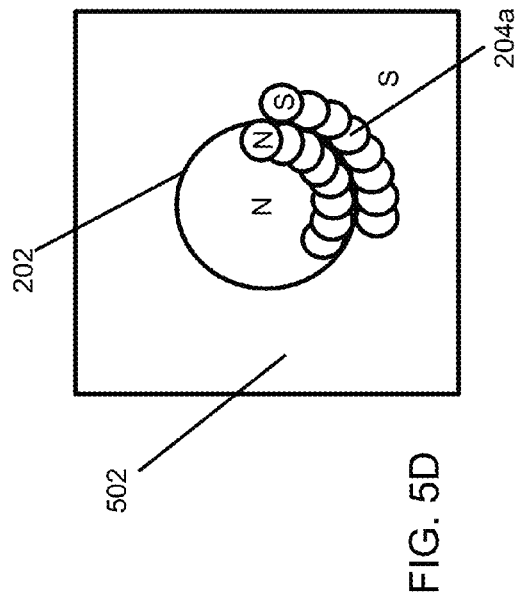
FIG. 5D depicts exemplary reinforcing North polarity maxels printed on the North polarity side of the polarity transition boundary between the North and South polarity portions of the multiple pole magnet and exemplary reinforcing South polarity maxels printed on the South polarity side of the polarity transition boundary between the North and South polarity portions of the multiple pole magnet.
Figure 5A:
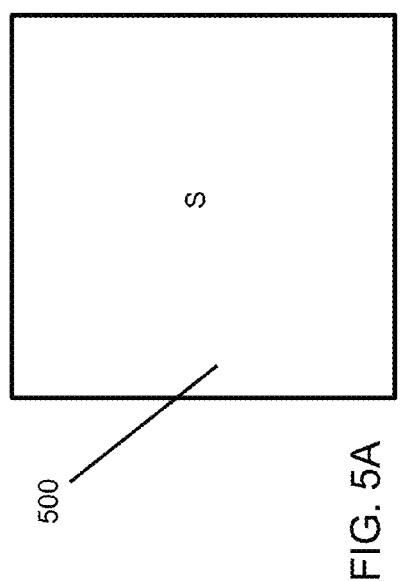
FIG. 5A depicts the South polarity side of a conventional single pole magnet.
Figure 5C:
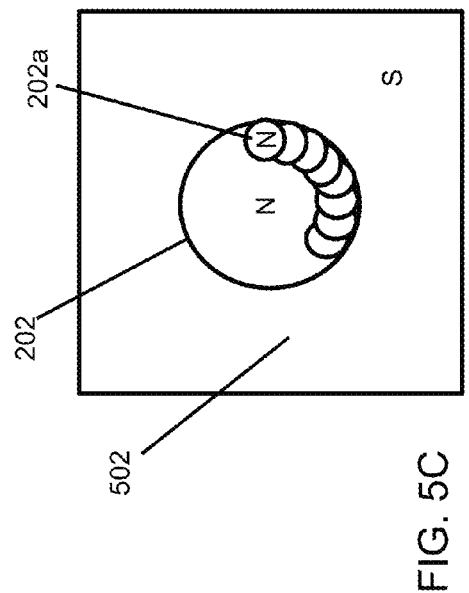
FIG. 5C depicts exemplary reinforcing North polarity maxels printed on the North polarity side of the polarity transition boundary between the North and South polarity portions of the multiple pole magnet.

Under another arrangement, reinforcing maxels are printed inside and/or outside the perimeter of a larger maxel. FIG. 5A depicts the South polarity side of a conventional single pole magnet 500. FIG. 5B depicts a multiple pole magnet 502 produced by printing a North maxel 202 on the South side of the conventional axially magnetized magnet 500 of FIG. 5A. A transition region 100 is shown having a portion inside the perimeter of the maxel and a portion outside the perimeter of the maxel. FIG. 5C depicts smaller North polarity maxels 202a having been printed inside the perimeter of the larger North polarity maxel 200. FIG. 5D shows South polarity maxels 204a printed outside the perimeter of the large North maxel 202.

Generally, maxels of different sizes can be printed such that they are overlaid within a given area to produce a composite magnetic field. FIG. 6A depicts three exemplary maxel sizes (i.e., diameters) for round maxels. FIG. 6B depicts a first large maxel with three smaller maxels printed inside its perimeter. FIG. 6C depicts the first large maxel with three smaller maxels having six even smaller maxels printed inside its perimeter. One skilled in the art will recognized that smaller and smaller maxels can be printed inside the perimeter and that such overlapping of maxels of N different sizes is similar to building up a radio frequency pulse using N harmonics of sine waves as shown in FIG. 6D and described in U.S. Pat. No. 7,428,258, which is incorporated herein by reference.

In accordance with the invention, a voice coil system-level design might use a magnetic structure having small polarity regions where all the magnetic flux between adjacent polarity regions on the back of the magnet can be shunted using a shunt plate to increase the force being projected from the front of the magnet into the air gap and then to either a metal plate or preferably a complementary printed magnetic structure on the other side of the air gap. With an even number of regions and a region size that allows all flux to be routed through the shunt plate, an embodiment of the present invention should be able to avoid routing any flux in the steel that extends between the magnets (the pieces that are perpendicular to the planar surface of the magnet, and parallel to the field lines extending from the magnets). In current designs, such as depicted in FIGS. 7A and 7B, flux from the back of the magnet is being routed through the steel plate that surrounds the entire assembly and provides no usable force (i.e., never enters the air gap and therefore does not interact with the copper coil). Referring to FIGS. 7A and 7B, a voice coil assembly 700 includes an arm assembly 702, a hollow coil 704, hold members 706, a yokes 708a 708b, supports 710a 710b, shaft 712, and a multiple pole magnet 102. The hollow coil includes two coil portions commonly referred to as coil legs 705a 705b.

A typical prior art voice coil has a relatively large loop so that the current in the coil legs interacts with both a North polarity region and a South polarity region at the same time—though flowing in opposite directions through the respective coil legs interacting with each respective polarity region to produce movement in a single direction. In accordance with the invention, a voice coil system can be made up of many smaller loops much like tines on a comb or a fork, where the size of the loops is related to the size of the polarity regions, such that current through each loop interacts with both polarity regions. Instead of two coil legs interacting with two polarity regions, there could be, for example, a dozen coil legs with each two coil legs of the dozen coil legs interacting with a respective two of a dozen polarity regions (e.g., 6 North and 6 South), where each polarity region would be providing approximately the same amount of torque as the single coil of the typical prior art voice coil as long as the flux density in the air gap above the polarity region is the same as the flux density in a given portion of the existing design. Such an arrangement is shown in FIG. 8A, where the multiple voice coil assembly 800 has three arm assemblies 702a-702c that are configured to move back and forth as the magnetic fields of the multiple pole magnets 102a-102c interact with the magnetic fields of the coil legs 705a 705b of the hollow coils 704a-704c. FIG. 8B depicts a magnetic field cross section corresponding to the three multiple pole magnets 102a-102c of FIG. 8A prior to printing reinforcing maxels. FIG. 8C depicts a magnetic field cross section corresponding to the three multiple pole magnets 102a-102c of FIG. 8A after transition regions have been reinforced with reinforcing maxels.

In a preferred embodiment there would be a balance of the number of polarity regions against inefficiencies of the transition zones and the size of the air gap, taking into account the shape of the coil required to establish movement.

To maximize constant flux area, the coil legs would not necessarily be the same size. The middle pair of legs could be wider than the legs on either side because there are no edge effects in the middle of the magnetic structure. A narrower coil could be used and still get full movement within the constant flux area of the outer leg pairs. Flux losses should be lower in the outside polarity regions than in the outer edges of current designs because the design above has outer polarity regions with a smaller area. With the multiple pole/multiple loop system, one can place the pivot point closer to the magnet to achieve the same arm travel range as with the conventional two-pole design.

A multiple pole/multiple loop system could be controlled by a switching mechanism to allow multiple coils to move beyond a single pole pair. If, for example, it was desirable for a coil to stop at 7 specific locations, it might be possible to switch coils to relevant Barker codes in succession over a Barker-7 printed in the magnet as one example. One skilled in the art will recognize that magnetic structures can have regular patterns or have irregular polarity patterns. Regular patterns may be alternating polarity patterns. Irregular polarity patterns may be produced randomly or be in accordance with designed codes such as Barker codes.

Smaller magnetic regions and lower field strength also means less back iron is required to channel flux on the back side, which saves steel (cost, space, weight).

Under one arrangement, in an embodiment that includes for example three coils, power consumption could be decreased by using only 1 or 2 loops out of three to move the arm, where seek time goes up, but power consumption goes down. Separate loops might also reduce lag as when current direction changes.

In accordance with another aspect of the invention, a conventional axially magnetized ring shaped single pole magnet 900 such as shown in FIG. 9A can be converted into a multiple pole magnetic structure (or multiple pole magnet) 902 by printing opposite polarity maxels on portions of the conventional magnet 900. FIG. 9A depicts the South polarity side of a conventional ring shaped single pole magnet 900. FIG. 9B depicts a multiple pole magnet 902 having four alternating polarity regions produced by printing patterns of different sized maxels on two opposing 90° arc segments of the single pole magnet 900. The maxel patterns include reinforcing maxels 202b, 202c printed alongside the polarity transition boundaries. Referring to FIG. 9B, each of the two printed maxel patterns includes five overlapping North polarity maxels of a first size 202a and two groups of overlapping smaller North polarity maxels of a second size 202b, 202c. Under another arrangement shown in FIG. 9C, two groups of maxels 204a, 204b having a South polarity are printed within each of the two South polarity portions of the multiple pole magnet 902 alongside polarity transition boundaries with the North polarity portions to achieve desired magnetic field characteristics across the polarity transitions of the structure.

In accordance with still another aspect of the invention, maxels are printed alongside a polarity transition boundary using a print head having an aperture size greater than the size of the material on which the maxels are being printed, which is explained using FIGS. 10A-10F. FIG. 10A depicts a bottom view of a circular print head 1002 having an aperture 1004 having a diameter D. FIG. 10B depicts a top view of a conventional single pole magnet 500 having a South polarity on its top surface, which would also have a North polarity on its bottom surface (not shown). The top of the magnet 500 has a width W and a Length L, which can be the same or different.

Figure 10I:
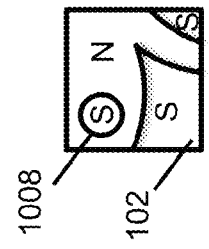
FIG. 10I depicts a South polarity magnetizing field produced by a print head having an aperture smaller than a magnet magnetizing a South polarity maxel inside a portion of a North polarity portion of the magnet as previously magnetized.
Figure 10H:
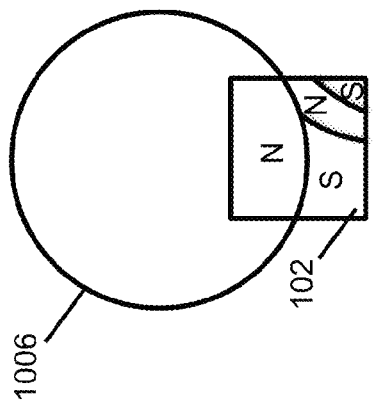
FIG. 10H provides an example of a magnetizing field having the same polarity overlapping different portions of a material.
Figure 10F:
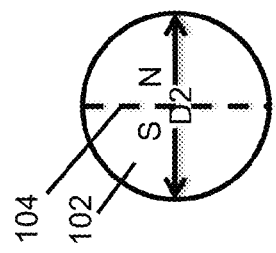
FIG. 10F depicts a round multi pole magnet produced using multiple magnetizing fields such as those shown in FIG. 10D.

In accordance with the invention, at least one dimension of the surface of the magnet upon which at least one maxel is printed is smaller than at least one dimension of the aperture of the print head used to print the maxel on the material. It this example, both the width W and length L are smaller than the diameter D of the aperture of the print head. Alternatively only one of the dimensions of the material may be smaller than a dimension of the aperture of the print head. Moreover, the aperture of the print head need not be round. It could be square, rectangular, oval, etc. Generally, the material is smaller than the aperture in at least one dimension such that a portion of the aperture can be placed over a portion of the material to magnetize that portion. In FIG. 10C, a magnetizing field 1006, which corresponds to the aperture 1004 of the print head 1002 of FIG. 10A, is shown overlapping a portion of the magnet 500 causing that portion to be magnetized to have a North polarity and thereby be converted to a multi pole magnet 102. In FIG. 10D, a sequence of magnetizing fields 1006a-1006h are used to magnetize half of the magnet 500 so as to create a polarity transition boundary 104. After the sequence of magnetizing fields have been produced a multi pole magnet having a first South polarity portion and a second North polarity portion is produced as shown in FIG. 10E, where the two portions can be substantially the same or not. In FIG. 10F, a similar multi pole magnet has been producing using multiple magnetizing fields such as those shown in FIG. 10D, where the diameter of the round multi pole magnet 102 of FIG. 1 OF is smaller than the diameter D of the aperture 1004 of the print head 1002 of FIG. 10A.

Figure 10G:
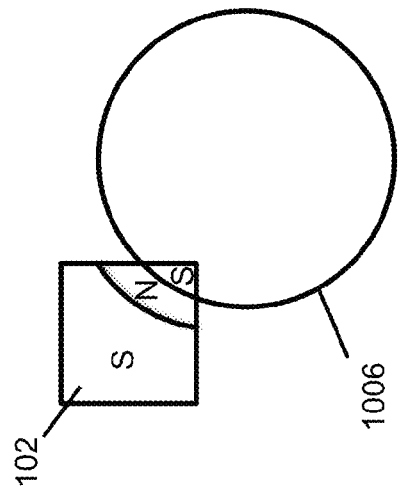
FIG. 10G depicts an example of magnetizing fields having North and South polarities magnetizing different overlapping portions of a material.

One skilled in the art will recognize that combinations of magnetizing fields of the same polarity or of different polarities can be used to magnetize different overlapping or non-overlapping portions of a material, which can be a larger material or a smaller material than the size of the aperture of the print heads producing the magnetizing fields. An example of magnetizing fields having North and South polarities magnetizing different overlapping portions of a material is provided in FIG. 10G, where a second magnetizing field 1006 having a South polarity is shown magnetizing a portion inside a North polarity portion of the magnet 102 that was magnetized in FIG. 10C by a first magnetizing field 1006 having a North polarity. FIG. 10H provides an example of a magnetizing field having the same polarity overlapping different portions of a material, where a third magnetizing field 1006 having a North polarity is shown magnetizing a different portion of the material including a portion of the material previously magnetized by the first magnetizing field having a North polarity thereby producing a different multi pole magnet 102.

One skilled in the art will recognize that different combinations of print heads having different sized apertures including apertures smaller than a material and apertures larger than a material can be employed to magnetize different portions of a material. FIG. 10I depicts a South polarity magnetizing field 1008 produced by a print head having an aperture smaller than a magnet magnetizing a South polarity maxel inside a portion of a North polarity portion of the magnet 102 as previously magnetized, as depicted in FIG. 10H, thereby producing a different multi pole magnet 102.

As described in U.S. Pat. No. 8,648,681 issued Feb. 11, 2014, which is incorporated by reference herein in its entirety, a c can used to affect characteristics of printed maxels. FIG. 11A depicts an example magnetizable material backing layer 1104 that is beneath and at least proximate to a magnetizable material 1102 with a maxel 202 being printed by a print head 1002 having an aperture 1004. The magnetizable material backing layer 1104 may comprise, by way of example but not limitation, a conductive ferromagnetic material, a non-conductive ferromagnetic material, a conductive non-ferromagnetic material (e.g., copper or silver), any combination thereof, and so forth. In an example implementation, a magnetizable material backing layer 1102 may comprise steel or a steel alloy that provides shielding that is capable of substantially limiting an amount of magnetic flux able to exit a bottom portion of the magnetizable material on which maxels are being printed.

FIG. 11B depicts an example print head backing layer 1106, which may be placed on a "back" side of a print head, with a "front" side of the print head comprising a side that may be placed against a magnetizable material 1102 when printing a maxel 202. A print head backing layer 1106 may comprise, by way of example but not limitation, a conductive ferromagnetic material, a non-conductive ferromagnetic material, a conductive non-ferromagnetic material (e.g., copper or silver), some combination thereof, and so forth. A print head backing layer may be thick or thin, may have a single layer or multiple layers, and may be formed from the same material or from different materials, or any combination thereof, and so forth. As depicted for example implementations, a print head backing layer 1106 may not include an aperture or may include an aperture.

FIG. 11C depicts printing of a maxel 202 onto a magnetizable material 1102 having a magnetizable material backing layer 1104 using print head 1002 having a print head backing layer 1106.

In accordance with the invention, a system and method for tailoring a polarity transition of a magnetic structure involves printing maxels alongside a polarity transition boundary of a magnetizable material, where the magnetizable material has a magnetizable material backing layer 1104 during printing of the maxels and/or a print head 1002 used to print the maxels has a print head backing layer 1106.

Figure 12A:
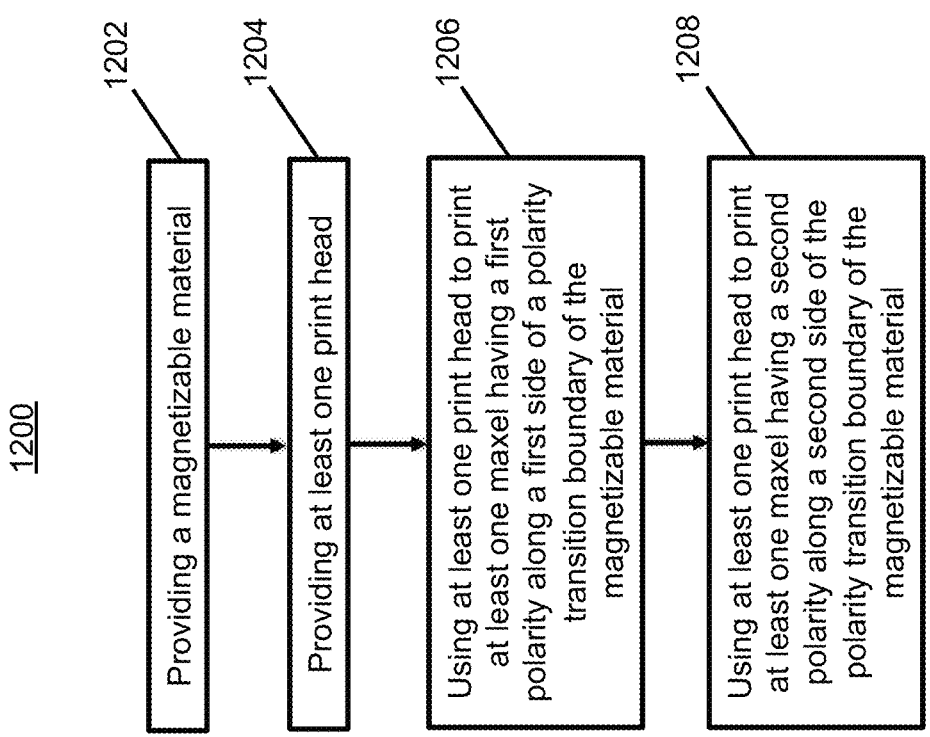
FIG. 12A depicts a first method for tailoring a polarity transition of a magnetic structure.

A first method 1200 for tailoring a polarity transition of a magnetic structure, depicted in FIG. 12A, comprises providing a magnetizable material 1202, providing a at least one print head 1204, using at least one print head to print at least one maxel having a first polarity along a first side of a polarity transition boundary of the magnetizable material 1206, and using at least one print head to print at least one maxel having a second polarity along a second side of the polarity transition boundary of the magnetizable material.

Figure 12B:
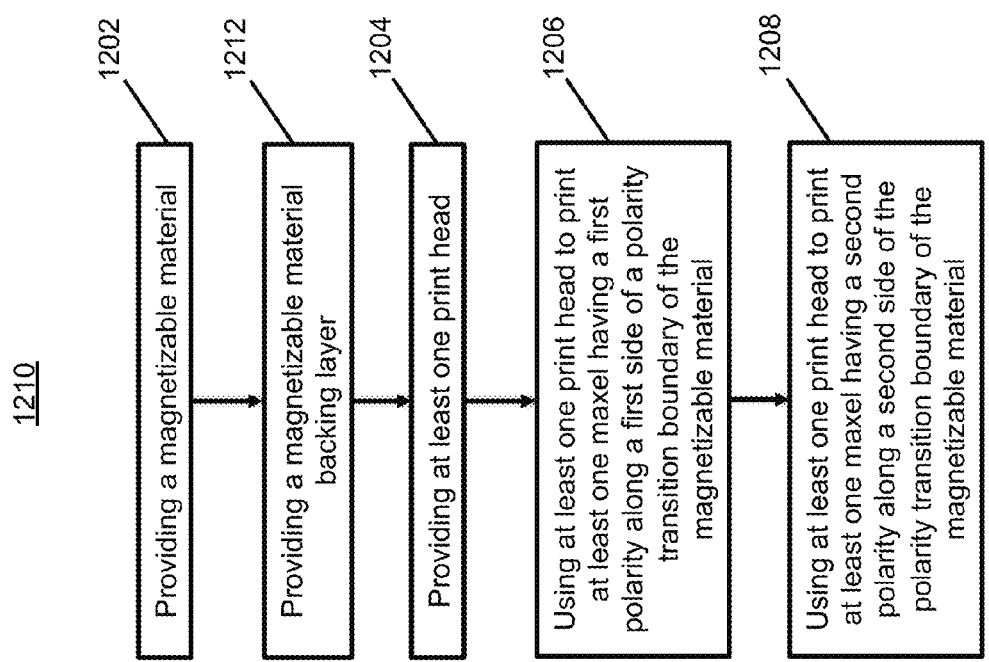
FIG. 12B depicts a second method for tailoring a polarity transition of a magnetic structure.

A second method 1210 for tailoring a polarity transition of a magnetic structure, depicted in FIG. 12B, is similar to the first method 1200 except it also comprises providing a magnetizable material backing layer 1212.

Figure 12C:
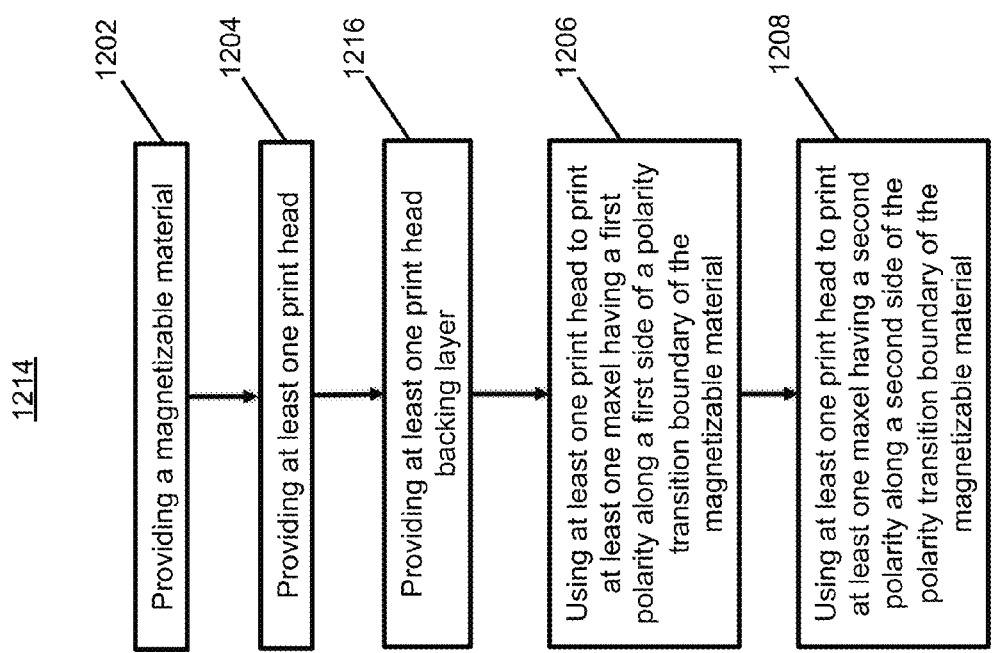
FIG. 12C depicts a third method 1214 for tailoring a polarity transition of a magnetic structure.

A third method 1214 for tailoring a polarity transition of a magnetic structure, depicted in FIG. 12C, is similar to the first method 1200 except it also comprises providing a print head backing layer 1216.

Figure 12D:
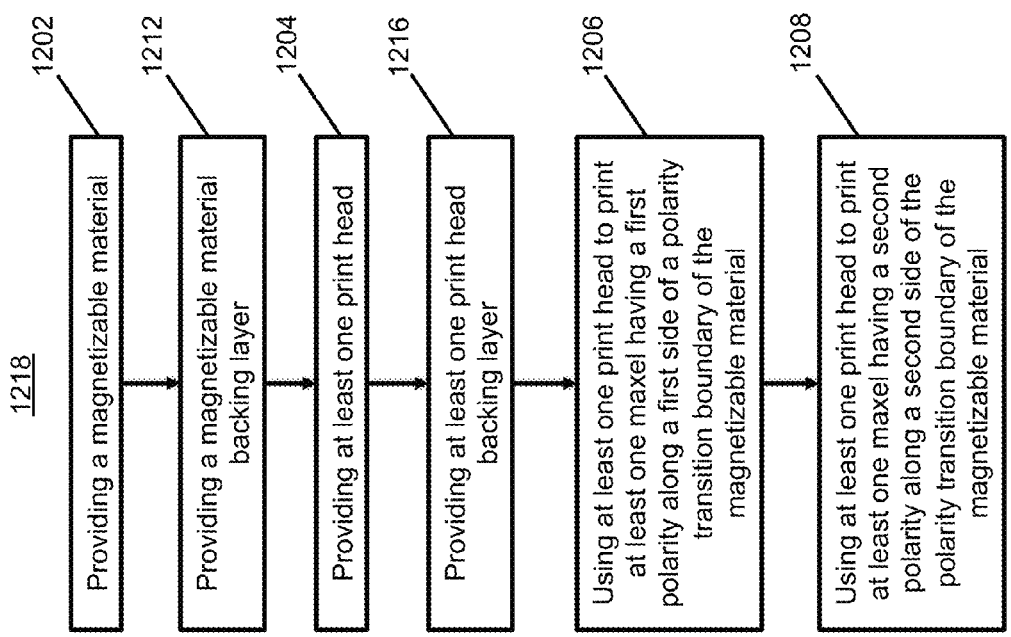
FIG. 12D depicts a fourth method 1218 for tailoring a polarity transition of a magnetic structure.

A fourth method 1218 for tailoring a polarity transition of a magnetic structure, depicted in FIG. 12D, is similar to the third method 1214 except it also comprises providing a magnetizable material backing layer 1212.

Figure 13:
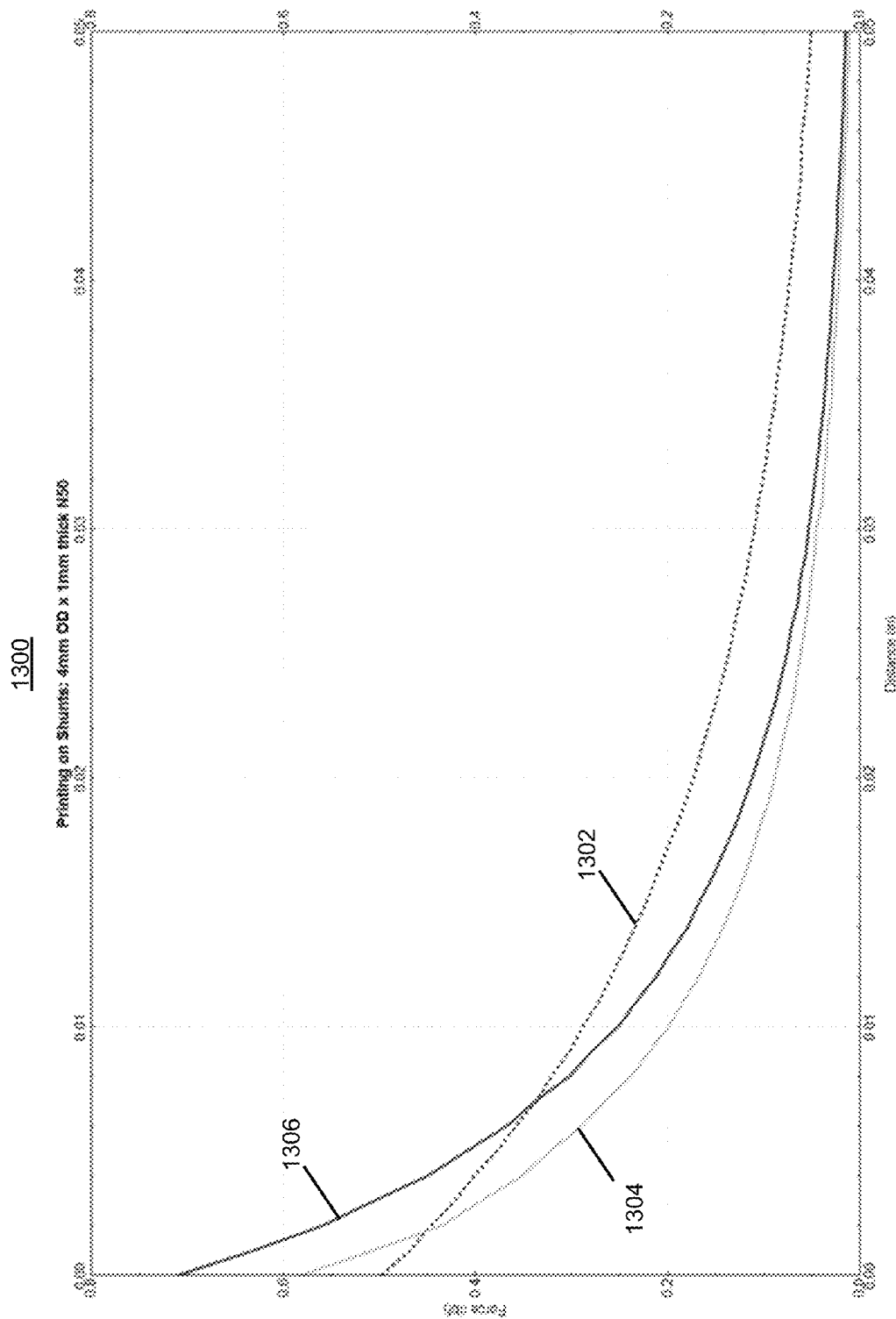
FIG. 13 depicts an exemplary force versus separation distance plot.

FIG. 13 depicts an exemplary force versus separation distance plot 1300 having a first force versus distance curve 1302 corresponding to a 4 mm OD×1 mm thick N50 grade disc magnet interfacing with 0.010" steel, a second first force versus distance curve 1304 corresponding to a 4 mm OD×1 mm thick N50 grade disc magnet having a pattern of maxels printed onto it without a magnetizable material backing plate (or shunt plate) present interfacing with 0.010" steel, and a third force versus distance curve 1306 corresponding to a 4 mm OD×1 mm thick N50 grade disc magnet having a pattern of maxels printed onto it with a magnetizable material backing plate present interfacing with 0.010" steel.

Figures 14A, 14B, 14C:
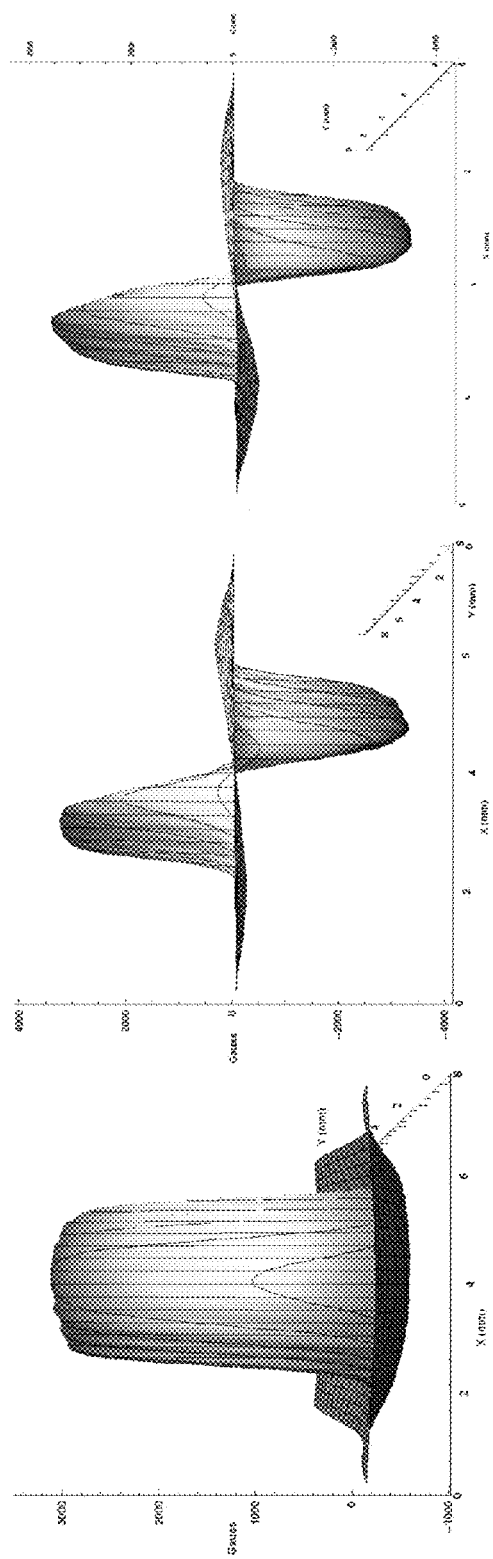
FIGS. 14A-14C depict surface plots of magnetic field scans of the standard magnet, multi pole magnet printed without a shunt plate, and a multi pole magnet printed with a shunt plate.

FIGS. 14A-14C depict surface plots of magnetic field scans of the standard magnet, multi pole magnet printed without a shunt plate, and multi pole magnet printed with a shunt plate, corresponding to the three force curves 1302, 1304, and 1306 of FIG. 13, respectively. As can be seen by comparing FIG. 14B to FIG. 14C, the slope across the transition region is steeper in FIG. 14C.

Figure 15C:
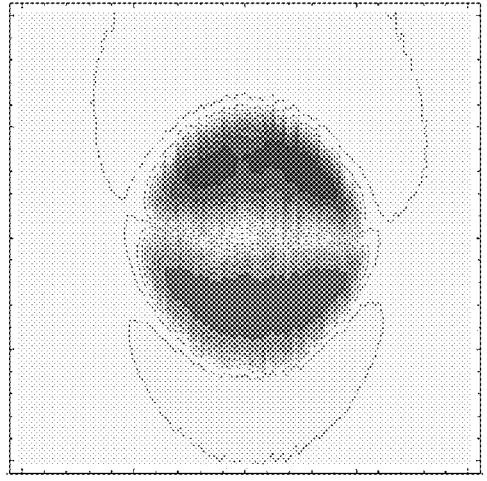
FIGS. 15A-15C depict contour plots of magnetic field scans of the standard magnet, multi pole magnet printed without a shunt plate, and a multi pole magnet printed with a shunt plate.
Figure 15B:
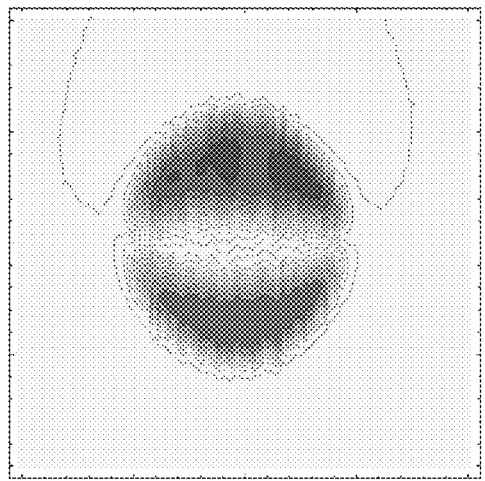
Figure 15A:
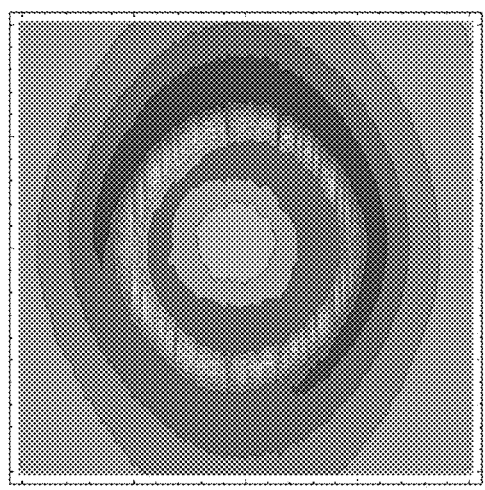

FIGS. 15A-15C depict contour plots of magnetic field scans of the standard magnet, multi pole magnet printed without a shunt plate, and multi pole magnet printed with a shunt plate, corresponding to the three force curves 1302, 1304, and 1306 of FIG. 13, respectively. As can be seen by comparing FIG. 15B to FIG. 15C, the field strength near the transition boundary of the multi pole magnet shown in FIG. 14C is greater than the field strength near the transition boundary of the multi pole magnet shown in FIG. 14B.

Figure 16D:
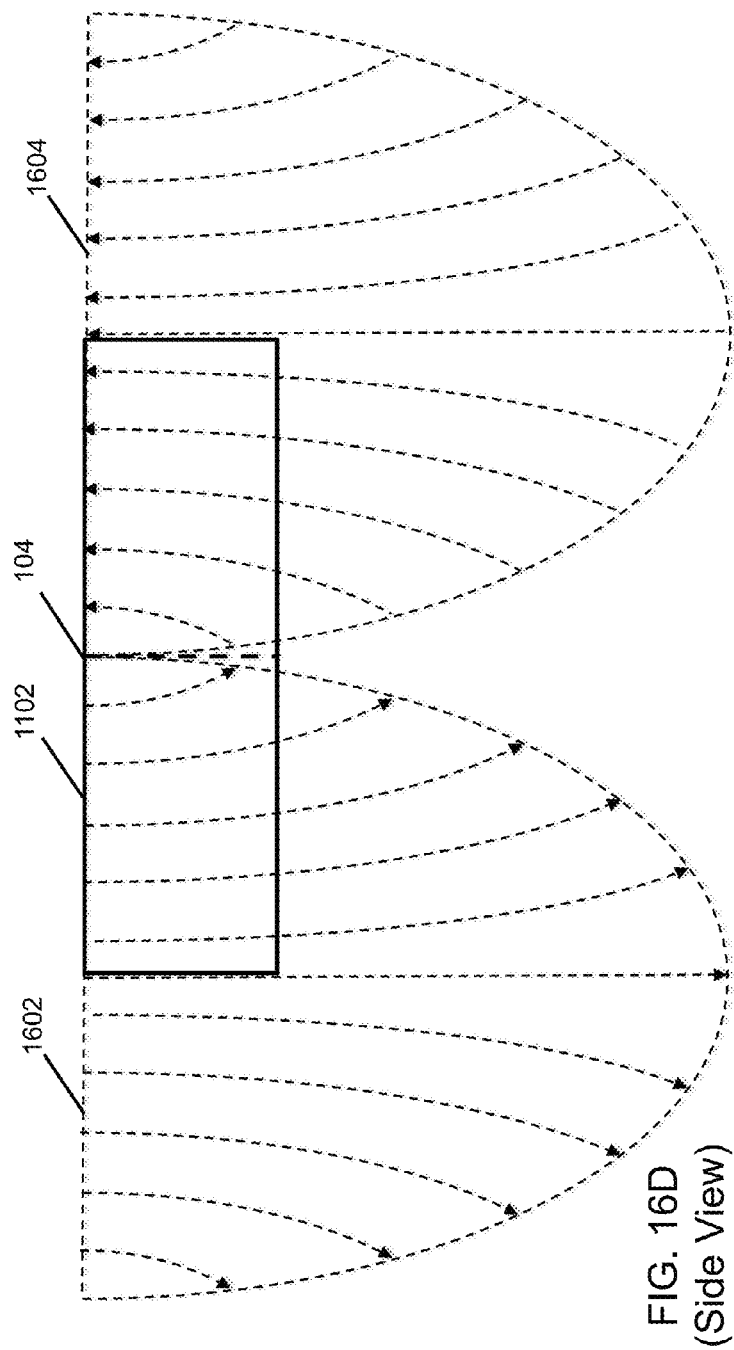

FIGS. 16A through 16D depict magnetization of a material 1102 using a first magnetizing field 1602 having a first magnetization direction and a second magnetizing field 1604 having a second magnetization direction that is opposite the first magnetization direction. FIG. 16A depicts a side view of a magnetization material 1102 prior to magnetization. FIG. 16B depicts a side view of a first magnetizing field 1602 having a first magnetization direction (or first magnetization polarity direction) and FIG. 16C depicts a side view of a second magnetizing field 1604 having a second magnetization direction (or second magnetization polarity direction), where one skilled in the art will understand that the difference between the magnetizing fields is the direction of the current applied to a print head. As shown in FIG. 16D, the two magnetizing fields 1602 1604 can be positioned such they will magnetize along a polarity transition boundary 104.

Figure 16E:
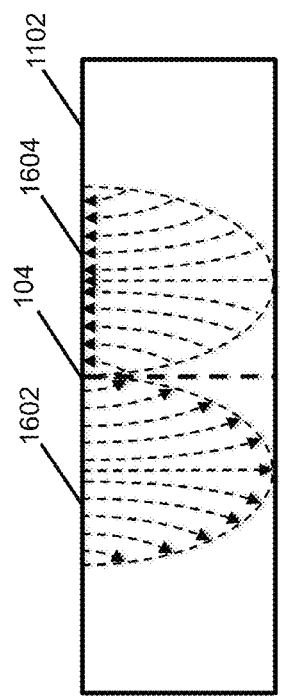
FIG. 16E also depicts magnetization of a material using a first magnetizing field having a first magnetization direction and a second magnetizing field having a second magnetization direction.

FIG. 16E also depicts magnetization of a material 1102 using a first magnetizing field 1602 having a first magnetization direction and a second magnetizing field 1604 having a second magnetization direction where the magnetizing fields are produced using a print head having a smaller aperture than the print head corresponding to the two magnetizing fields of FIG. 16D. As seen when comparing FIG. 16D to FIG. 16E, the larger print heads magnetize more of the material including more of the material in the portion of the magnet near the polarity transition boundary 104.

In accordance with one aspect of the invention, the field strength of a magnetizing field can be varied to determine an optimal magnetizing field strength of a given print head that will achieve desirable magnetization characteristics such as a steep transition across a polarity transition boundary, etc.

In accordance with another aspect of the invention, the height of a print head above a material can be varied from zero height (i.e., print in contact with material) to some optimal height above the material to produce an optimal magnetizing field strength of a given print head that will achieve desirable magnetization characteristics.

Figure 16F:
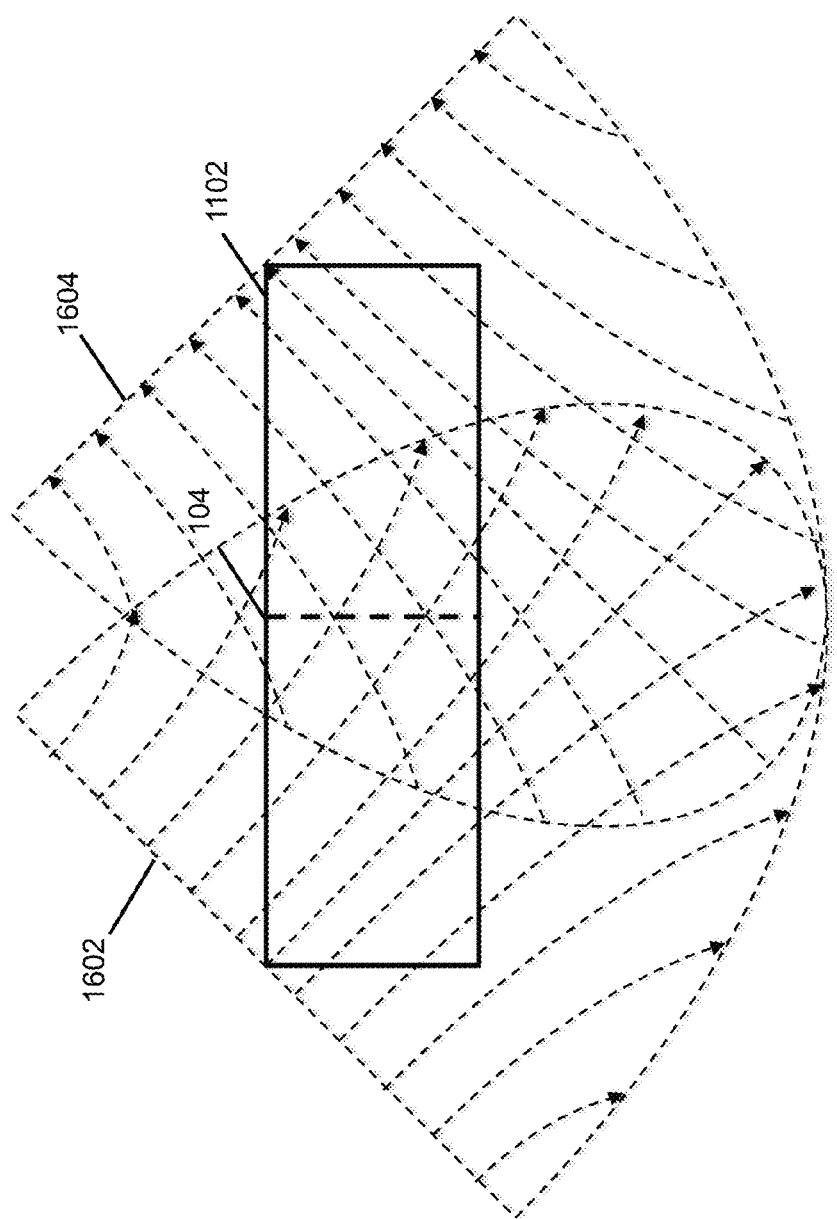
FIGS. 16F and 16G depict two examples of the magnetization approach of FIG. 16E.
Figure 16G:
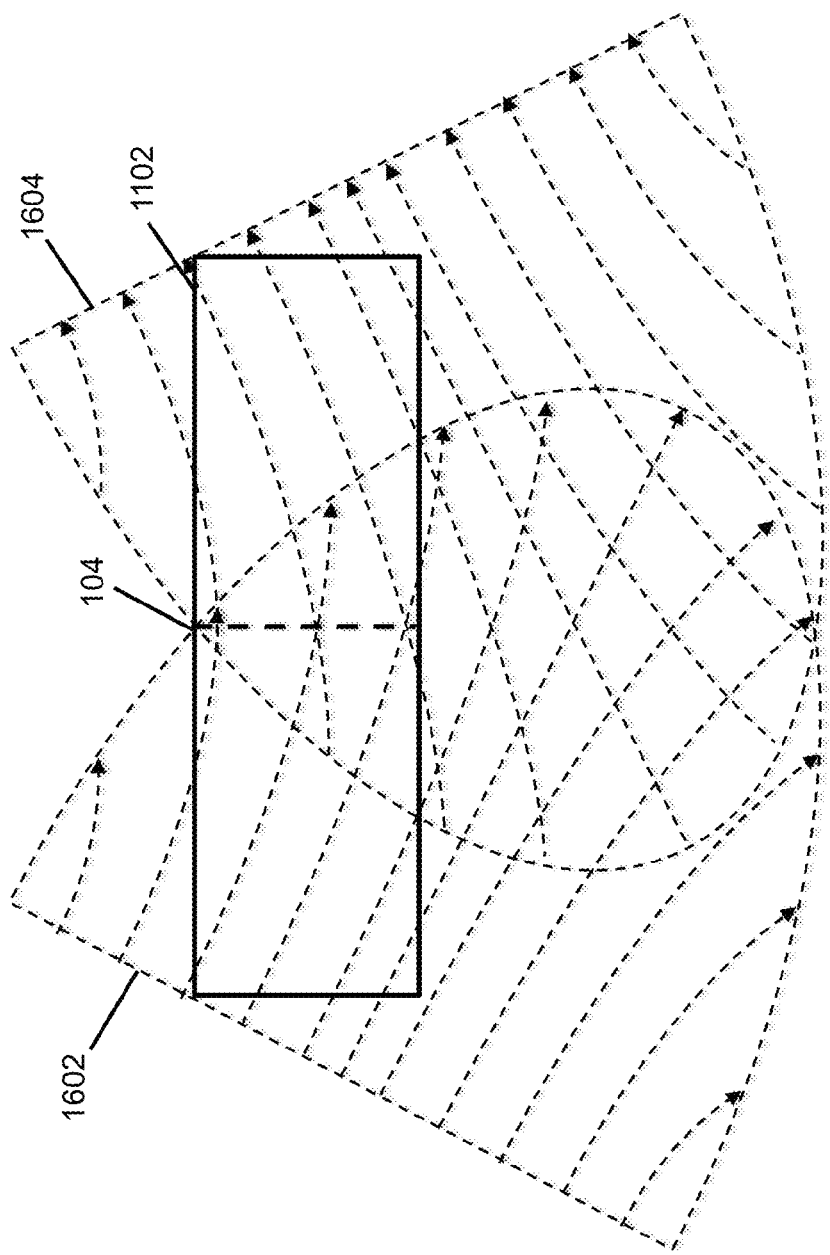

Moreover, magnetizing fields can be produced that are not perpendicular to the surface of a material, where the magnetization direction of the fields can be plus and minus some angle relative to the surface about a polarity transition boundary. Two examples of this magnetization approach are provided in FIG. 16F and FIG. 16G. Magnetization of a material using non-vertical magnetization fields is described in pending U.S. application Ser. No. 13/959,201, filed Aug. 5, 2013, titled "System and Method for Magnetization", which was previously incorporated by reference.

While particular embodiments of the invention have been described, it will be understood, however, that the invention is not limited thereto, since modifications may be made by those skilled in the art, particularly in light of the foregoing teachings.

The invention claimed is:

1. A magnetic structure having multiple poles, comprising:
   a first polarity region magnetized to have a first polarity;
   a second polarity region magnetized to have a second polarity; and
   a polarity transition boundary, at least one of said first polarity region or said second polarity region having at least one reinforcing maxel that was printed alongside said polarity transition boundary.

2. The magnetic structure of claim 1, wherein said at least one reinforcing maxel changes magnetic field characteristics across a polarity transition.

3. The magnetic structure of claim 2, wherein the polarity transition has a steeper slope than the slope of the polarity transition of the magnetic structure without said at least one reinforcing maxel.

4. The magnetic structure of claim 1, wherein said at least one reinforcing maxel enables more efficient use of a magnetizable material.

5. The magnetic structure of claim 1, wherein said at least one reinforcing maxel produces higher torque.

6. The magnetic structure of claim 1, wherein said first polarity region has at least one reinforcing maxel having said first polarity.

7. The magnetic structure of claim 6, wherein said second polarity region has at least one reinforcing maxel having said second polarity.

8. The magnetic structure of claim 1, wherein said at least one reinforcing maxel comprises a round maxel.

9. The magnetic structure of claim 1, wherein said at least one reinforcing maxel comprises an elongated maxel.

10. The magnetic structure of claim 1, wherein said at least one reinforcing maxel comprises a first maxel that overlaps a second maxel.

11. The magnetic structure of claim 1, wherein said at least one reinforcing maxel comprises a row of maxels.

12. The magnetic structure of claim 1, wherein said at least one reinforcing maxel comprises maxels printed along a curved perimeter of at least one of said first polarity region or said second polarity region.

13. The magnetic structure of claim 1, wherein said at least one reinforcing maxel comprises maxels having different sizes.

14. The magnetic structure of claim 1, wherein said at least one reinforcing maxel comprises maxels having different shapes.

15. The magnetic structure of claim 1, wherein said at least one reinforcing maxel comprises maxels having different amplitudes.

16. The magnetic structure of claim 1, wherein said magnetic structure was produced by printing a maxel having said first polarity onto a side of a single pole magnet having said second polarity.

17. The magnetic structure of claim 1, wherein at least one dimension of the surface of a magnetizable material upon which said at least one reinforcing maxel was printed is smaller than at least one dimension of the aperture of the print head used to print the at least one reinforcing maxel.

18. The magnetic structure of claim 1, wherein said magnetic structure was produced by printing a maxel with a magnetizable material backing layer beneath and at least proximate to the magnetizable material upon which said at least one reinforcing maxel was printed.

19. The magnetic structure of claim 18, wherein said magnetizable material backing layer comprises at least one of a conductive ferromagnetic material, a non-conductive ferromagnetic material, or a conductive non-ferromagnetic material.

20. The magnetic structure of claim 1, wherein said magnetic structure was produced by printing a maxel using a print head having a print head backing layer.

* * * * *